US012651357B2

(12) United States Patent
Sinharoy et al.

(10) Patent No.: US 12,651,357 B2
(45) Date of Patent: Jun. 9, 2026

(54) EYEBALL MOVEMENT DETECTION IN CLOSED EYE BASED ON VIDEO

(71) Applicant: Samsung Electronics Co., Ltd., Suwon-si (KR)

(72) Inventors: Indranil Sinharoy, Richardson, TX (US); Aditya Dave, Plano, TX (US); Lianjun Li, McKinney, TX (US); Hao Chen, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/586,290

(22) Filed: Feb. 23, 2024

(65) Prior Publication Data

US 2025/0022146 A1 Jan. 16, 2025

Related U.S. Application Data

(60) Provisional application No. 63/526,647, filed on Jul. 13, 2023.

(51) Int. Cl.
G06T 7/11 (2017.01)
G06T 7/246 (2017.01)
(Continued)

(52) U.S. Cl.
CPC .............. G06T 7/248 (2017.01); G06T 7/11 (2017.01); G06V 10/25 (2022.01); G06V 20/40 (2022.01);
(Continued)

(58) Field of Classification Search
CPC . G06T 7/248; G06T 7/11; G06T 2207/10016; G06T 2207/30201;
(Continued)

(56) References Cited

U.S. PATENT DOCUMENTS 11,557,020 B2 1/2023 Connor
11,698,527 B2 7/2023 Chung et al.
(Continued)

FOREIGN PATENT DOCUMENTS

CN 110097039 A 8/2019
CN 116115878 A 5/2023
(Continued)

OTHER PUBLICATIONS

International Search Report and Written Opinion issued Oct. 15, 2024 regarding International Application No. PCT/KR2024/009514, 11 pages.
(Continued)

*Primary Examiner* — Duy M Dang

(57) ABSTRACT

A method includes receiving, by a processor, a video of an illuminated face. Video frames in the video are associated with different time instants of a time series, respectively. The method includes determining a region of interest (ROI) that includes a closed eye on the face based on at least one frame in a plurality of video frames in the video. The method includes slicing each ROI based on slice parameters for selecting a vertical slice that includes a eye centroid of the closed eye, and selecting a horizontal slice that intersects the vertical slice at a pivot (P) located $l_p$ pixels from the eye centroid. The method includes determining an eyeball motion signal according to the time series, based on a measured value of a shadow intensity of the eye within at least one of the vertical slice or the horizontal slice at each of the different time instants.

20 Claims, 25 Drawing Sheets

(51) Int. Cl.

| | |
|---|---|
| *G06V 10/25* | (2022.01) |
| *G06V 20/40* | (2022.01) |
| *G06V 40/18* | (2022.01) |

(52) U.S. Cl.

CPC .... *G06V 40/18* (2022.01); *G06T 2207/10016* (2013.01); *G06T 2207/30201* (2013.01)

(58) Field of Classification Search

CPC ........ G06T 7/246; G06V 10/25; G06V 20/40; G06V 40/18; G06V 40/167; G06V 40/171; G06V 40/193

USPC .......................................... 382/103, 107, 115

See application file for complete search history.

(56) References Cited

U.S. PATENT DOCUMENTS

| | | | |
|---|---|---|---|
| 11,727,720 | B2 | 8/2023 | Son et al. |
| 2013/0114850 | A1* | 5/2013 | Publicover ................ G06T 7/74 |
| | | | 382/103 |
| 2014/0111771 | A1 | 4/2014 | Liu |
| 2017/0102767 | A1 | 4/2017 | Kim et al. |
| 2019/0290192 | A1 | 9/2019 | Pugh et al. |
| 2020/0085296 | A1 | 3/2020 | Zhang et al. |
| 2020/0097767 | A1 | 3/2020 | Perry et al. |
| 2020/0228339 | A1 | 7/2020 | Barham et al. |
| 2020/0410644 | A1 | 12/2020 | Connor |
| 2021/0012091 | A1 | 1/2021 | Liu et al. |

FOREIGN PATENT DOCUMENTS

| | | |
|---|---|---|
| CN | 116312972 B | 8/2023 |
| JP | 2010-129050 A | 6/2010 |
| JP | 2016-137155 A | 8/2016 |
| KR | 20180066610 A | 6/2018 |
| KR | 10-2020-0014889 A | 2/2020 |
| KR | 10-2020-0031503 A | 3/2020 |
| KR | 10-2023-0040041 A | 3/2023 |

OTHER PUBLICATIONS

Findling et al., "Closed-Eye Gaze Gestures: Detection and Recognition of Closed-Eye Movements with Cameras in Smart Glasses", Advances in Computational Intelligence—15th International Work-Conference on Artificial Neural Networks (IWANN 2019), Jun. 2019, 12 pages.

Kobashi et al., "Eye Position Estimation During Sleep Using Infrared Video in Functional MRI", Journal of Advanced Computational Intelligence and Intelligent Informatics, vol. 12, No. 1, Jan. 2008, pp. 32-40.

\* cited by examiner

1400

1500

$$l_{v1} > l_{v2}$$

EYEBALL MOVEMENT DETECTION IN CLOSED EYE BASED ON VIDEO

CROSS-REFERENCE TO RELATED APPLICATION(S) AND CLAIM OF PRIORITY

This application claims priority under 35 U.S.C. § 119(e) to U.S. Provisional Patent Application No. 63/526,647 filed on Jul. 13, 2023. The above-identified provisional patent application is hereby incorporated by reference in its entirety.

TECHNICAL FIELD

This disclosure relates generally to oculography. More specifically, this disclosure relates to eyeball movement detection in closed eye based on video.

BACKGROUND

Detection of eyeball motion and position of an eyeball in a closed-eye state can be useful for several purposes. For example, the detection of eyeball motion and position of the eyeball in the closed-eye state can be used to detect a sleep stage. Examples of sleep stages include rapid eye movement (REM) stage and non-rapid eye movement (NREM) stage. This sleep stage data can be used to improve the quality of sleep. For example, medical intervention methods can incorporate this sleep stage data to aid in detecting sleep abnormalities. As another example, eyeball motion, both under closed and open eye conditions, can be incorporated into gaming and virtual reality applications to provide greater immersive experience.

Electrooculography (EOG) is the most common and most accurate technique for detecting eye motion under closed eye state. However, the EOG technique requires placing multiple (at least three) electrodes on the face of the user, usually placed around the eyes. This procedure of obtaining measurements from electrodes worn on the eyes is inconvenient during sleep, and sometimes disruptive to sleep. Compared to a medical product in which electrodes are placed on the user by medical personnel, it is impractical to place electrodes on the head of a user in commercial products for aiding users' sleep quality and duration.

While there are several techniques to use video analysis to detect and track a person's eyeball motion when the eyelids are open, for example in Video-oculography (VOG), closed-eye eyeball motion estimation is more challenging. There are no established contemporary techniques for closed-eye video-based oculography.

SUMMARY

This disclosure provides eyeball movement detection in closed eye based on video. That is, the present disclosure relates to eye tracking while the eyes are closed (eyeballs hidden under the eyelids).

In one embodiment, a method for detecting eyeball movement under a closed eyelid based on video data is provided. The method includes receiving, by a processor, a video of an illuminated face. Video frames in the video are associated with different time instants of a time series, respectively. The method includes determining a region of interest (ROI) that includes an eye in a closed-eye state on the illuminated face based on at least one frame in a plurality of video frames in the video. The method includes slicing each ROI based on slice parameters for selecting a first vertical slice that includes a first eye centroid of the eye in the closed-eye state, and selecting a first horizontal slice that intersects the first vertical slice at a pivot (P) located $l_p$ pixels from the first eye centroid. The method includes determining an eyeball motion signal according to at least the time series, based on a measured value of a shadow intensity of the eye within at least one of the first vertical slice or the first horizontal slice at each of the different time instants.

In another embodiment, a system for detecting eyeball movement under a closed eyelid based on video data is provided. The system includes a processor configured to receive a video of an illuminated face. Video frames in the video are associated with different time instants of a time series, respectively. The processor is configured to determine a region of interest (ROI) that includes an eye in a closed-eye state on the illuminated face based on at least one frame in a plurality of video frames in the video. The processor is configured to slice each ROI based on slice parameters for selecting a first vertical slice that includes a first eye centroid of the eye in the closed-eye state, and selecting a first horizontal slice that intersects the first vertical slice at a pivot (P) located $l_p$ pixels from the first eye centroid. The processor is configured to determine an eyeball motion signal according to at least the time series, based on a measured value of a shadow intensity of the eye within at least one of the first vertical slice or the first horizontal slice at each of the different time instants.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
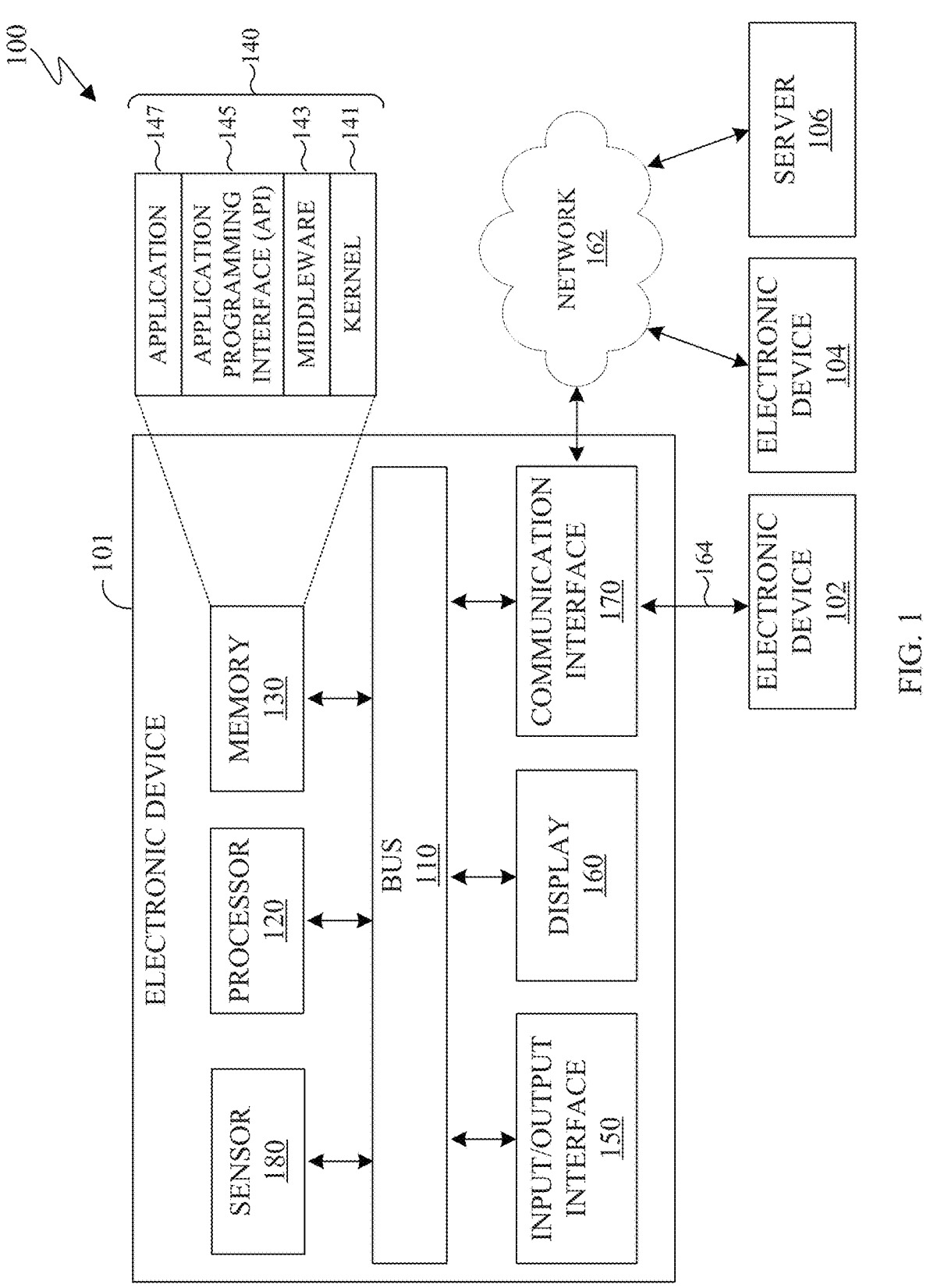
FIG. 1 illustrates an example network configuration including an electronic device according to this disclosure.

FIGS. 1 through 30B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Detecting the position and motion of eyeballs under closed eyelids non-invasively is a challenging problem because the iris, pupil, cornea, or the retina are not visible. Conversely, non-invasive eye-tracking is relatively straightforward when the eyelids are open and corneal reflections, pupil reflections, and iris shape can be observed visibly. However, conventional eye-tracking methods fail when the eyes are in a closed state, namely, when the eyelids are closed.

Inferring motion of an eyeball that is under closed eyelids has used optical flow in a few use cases. However, the optical flow only works when the position of the illumination and the position of the video camera are constrained to a fixed position with respect to the eyes. The optical flow is not a truly non-invasive system for inferring motion of an eyeball because motion of the head of the user (e.g., global head motion) causes the position of the eyes to move, thereby obliterating the constraint of the eyes being located at a fixed position with respect to the position of the illumination and the video camera. Also, optical flow methods are limited due to the disproportionality of the skin motion, if any, over the eyelids during eyeball movement under the skin. According to embodiments of this disclosure, the user is able to move the head of the user freely in a system (200 of FIG. 2) that is truly non-invasive, which requires disentangling the local eyeball motion from the global head motion.

Detection of eyeball motion and position of an eyeball in a closed-eye state can be useful for several purposes. For example, the nature (frequency, amplitude, etc.) of the eyeball motion can be used to detect a sleep stage that provides insights into a person's sleep pattern, quality, and duration. This sleep stage data can be used in medical intervention methods to aid in detecting sleep abnormalities such as sleep apnea, and preventing serious injuries during sleep. This eyeball motion and position data and sleep stage data can be used in real-time and incorporated into medical and commercial products and devices that are designed to improve the quality and duration of sleep.

The nature of eyeball motion data can be also used as a health monitoring tool during neurological disorders such as Parkinson's disease, Alzheimer's disease, and multiple sclerosis. As another example, the nature of eyeball motion data can reveal linear and torsional eye movements in vestibular patients and for early stroke recognition while a patient is asleep. The nature of the eyeball motion during sleep can be used for dream analysis and understanding in psychotherapies to reveal underlying motivations, unconscious desires, etc.

This disclosure describes an apparatus and associated methods for non-invasively detecting eyeball motion under eyelids in a closed-eye state. For ease of explanation, the methods described herein are in the context of a smart sleep chair for improving the quality and duration of sleep of the user. The methods according to embodiments of this disclosure are general enough to be applied to other use cases as well.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations to support eyeball movement detection in a closed eye state based on video.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for eyeball movement detection in a closed eye state based on video as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the first external electronic device 102 (such as the HMD), the electronic device 101 can communicate with the first external electronic device 102 through the communication interface 170. The electronic device 101 can be directly connected with the first external electronic device 102 to communicate with the first external electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the first and second external electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as first and second external electronic devices 102 and 104 or server 106) to perform at least some functions associated therewith. The other electronic device (such as first and second external electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the second external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support driving the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support eyeball movement detection in a closed eye state based on video.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
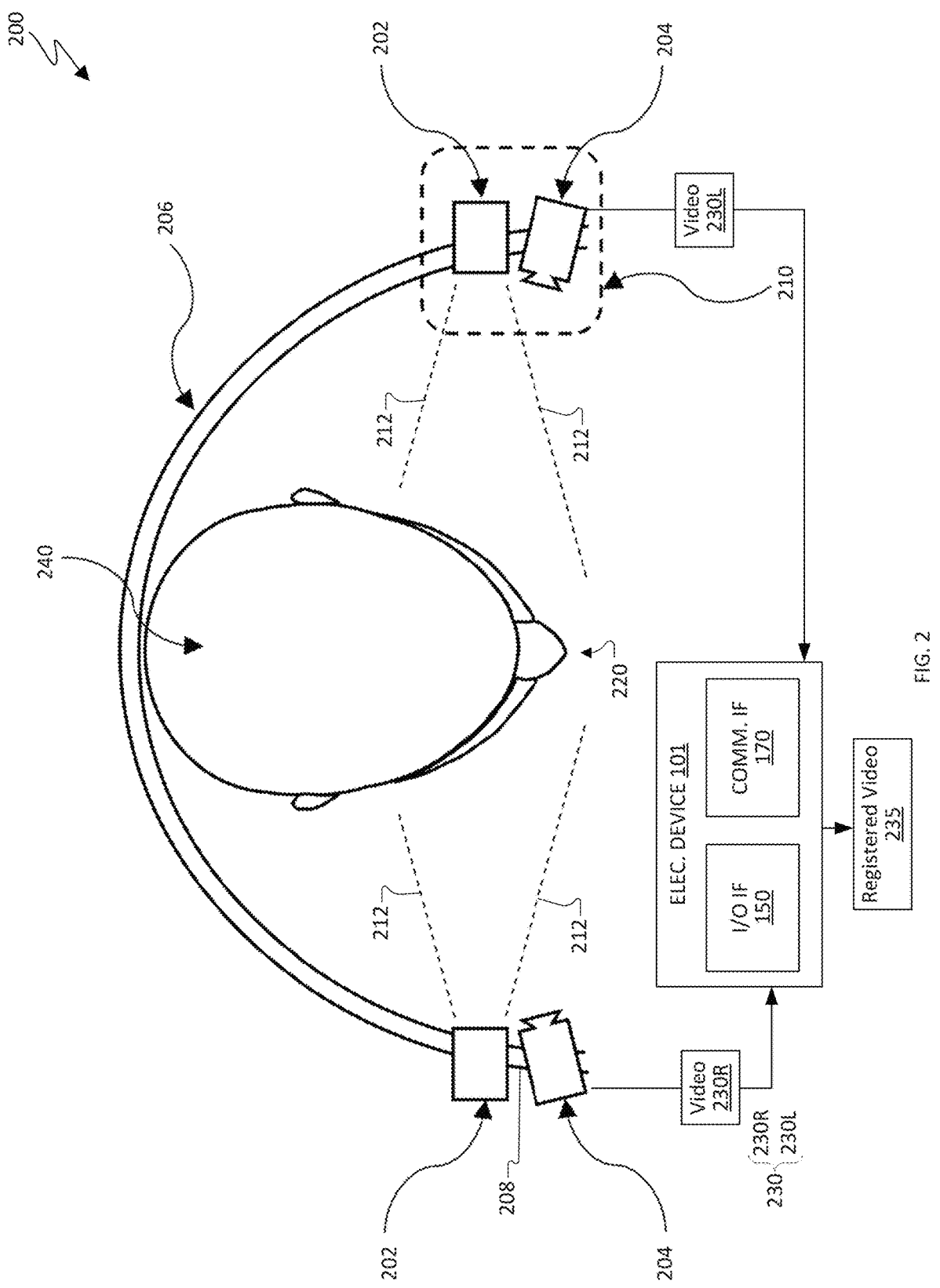
FIG. 2 illustrates an example system for detecting eyeball movement under a closed eyelid based on video data, according to this disclosure.

FIG. 2 illustrates an example system 200 for detecting eyeball movement under a closed eyelid based on video data, according to this disclosure. The embodiment of the video-based closed-eye eyeball motion detection system 200 shown in FIG. 2 is for illustration only, and other embodiments could be used without departing from the scope of this disclosure.

The system 200 includes at least one light source 202 that illuminates a face 220 of a user, at least one camera 204 that captures a video 230 of the illuminated face, and a headrest 206 on which the user may lay his or her head 240 for support. The light source 202 can emit non-visible light such as infrared (IR) light, can emit visible light, or can provide both non-visible illumination and visible illumination.

In some embodiments of the system 200, the at least one camera 204 includes a single camera 204 that has a field of view that covers the entire face 220 of the user and is able to capture both eyes of the user in the video 230. In some embodiments, the at least one camera 204 includes multiple cameras, and each of the multiple cameras has a field of view that covers the entire face 220 of the user and is able to capture both eyes of the user in each of the videos 230L and 230R. In some embodiments, the at least one camera 204 includes multiple cameras, wherein one of the multiple cameras has a field of view that covers a partial of the face 220 and is able to capture the left eye of the user in the video 230L, and a different one of the multiple cameras has a field of view that covers a partial of the face 220 and is able to capture the right eye of the user in the video 230R. The electronic device 101 can input the videos 230L and 230R to an image stitching process that generates the video 230 of the entire face 220.

The headrest 206 can have a semicircular shape or U-shape to which the light source 202 and the camera 204 attach. In some embodiments, the headrest 206 includes at least one sliding platform 208, and each of the two ends of the U-shape is an end of the at least one sliding platform 208. The light source 202 and the camera 204 can be located between the end of the sliding platform 208 and the vertex of the U-shape. In some embodiments, the locations where the light source 202 and camera 204 are attached to headrest 206 are fixed, and the orientations of the light source 202 and camera 204 relative to the vertex of the U-shape can be rotated to adjust the light field 212 that illuminates the face 220 and to adjust the scene within the field of view of the camera 204.

In some embodiments, the system 200 includes one or more capture devices 210 that attach to the headrest 206. A capture device 210 houses the light source 202 and camera 204. For example, a capture device 210 includes at least one IR camera and at least one IR illuminator (i.e., IR light source). The positions of the one or more IR illuminators with respect to the IR camera in each capture device 210 is designed to boost the shadow cast in the eye region of the face 220 by the bulge of the eyeball under the eyelids. Although using IR illumination and an IR camera is not mandatory, their use provides some advantages. Firstly, one advantage of non-visible illumination and video capture, the user is expected to either completely turn off or use very dim lights (in the visible light spectrum) while sleeping or resting. Illumination outside the visible spectrum allows the IR camera to record images/videos of the eye region of the face 220 without (interference from visible light) interfering with the user's sleep. Secondly, as another advantage, using the IR illuminator (of a specific set of near infrared (NIR) wavelengths) to cast a shadow while eliminating irradiance from ambient light sources greatly improves the image contrast of the eye region within the captured video 230. Better contrast in the eye region results in better-quality motion signals derived from shadow movements. Finally, although human skin tones are not completely invariant to IR illumination, the contrast between the shadow relative to or compared to no-shadow regions is affected by skin tones (especially, dark) to a lesser degree under IR illumination compared to the affect that skin tones illuminated under visible light have on the contrast.

In some embodiments, the system 200 further includes an electronic device that includes a processor, such as the electronic device 101 that includes the processor 120 of FIG. 1. In other embodiments, the system 200 is operably coupled to the electronic device 101 to implement a non-invasive method (such as the method 300 of FIG. 3 or the method 3000 of FIGS. 30A and 30B) for detecting eyeball motion under closed eyelids in videos captured of the face 220 under illumination (for example, non-visible illumination, visible illumination, or both).

Although FIG. 2 illustrates one example of a system 200 for detecting eyeball movement under a closed eyelid based on video data, various changes may be made to FIG. 2. For example, the position and orientation of components with or attached to the capture device 210 can be changed using motors driven by the electronic device 101, as described further below with FIGS. 26 and 27. Also, while FIG. 2 illustrates one operational environment in which various features disclosed in this patent document can be used, these features could be used in any other suitable system. The system 200 can be used for detecting eyeball motion and Rapid Eye Movement (REM) analysis under closed-eye conditions in products and applications related to sleep analysis such as smart sleep chairs, sleep-enhancing products, etc. As another use case, the system 200 can be used for detecting eyeball motion under closed eyelids as a health monitoring tool during neurological disorders such as Parkinson's disease, Alzheimer's disease, and multiple sclerosis. As another use case, the system 200 can be used for analyzing eye motion during sleep for dream analysis and understanding in psychotherapies to reveal underlying motivations, unconscious desires, etc. In another use case, the system 200 can reveal linear and torsional eye movements in vestibular patients and for early stroke recognition while the patient is asleep.

Figure 3:
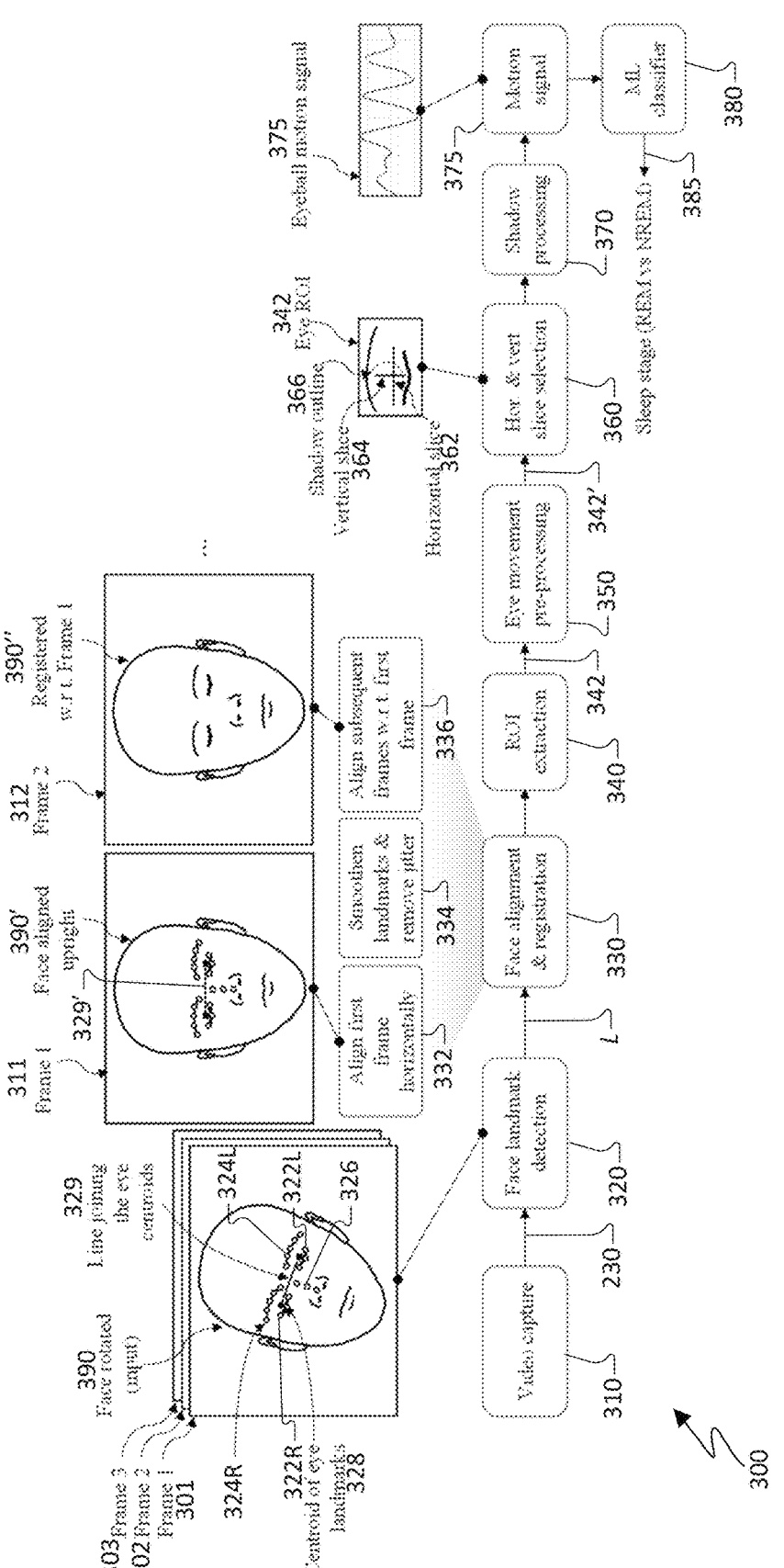
FIG. 3 illustrates processing blocks for detecting eyeball motion in closed eyes from videos, according to this disclosure.

FIG. 3 illustrates processing blocks for describing a method 300 for detecting, by the electronic device 101 of FIG. 1, eyeball motion in closed eyes from videos (e.g., the video 230 captured by the system 200 of FIG. 2), according to this disclosure. The embodiment of the method 300 shown in FIG. 3 is for illustration only, and other embodiments could be used without departing from the scope of this disclosure.

Regarding the non-invasive method for detecting eyeball motion under closed eyelids, the method includes detecting the temporal variations of the shadows on the closed eyelids cast by the eyeball bulge. Firstly, a captured video frame is reoriented such that the user's face is aligned in a specific way with respect to the video frame's horizontal and vertical axes by using certain facial landmarks detected on the user's face. This alignment operation is performed to normalize the face orientation with respect to the video frames. Secondly, subsequent frames (such as non-reference frames) in the video are registered using a subset of the detected facial features to ensure consistent facial pose within all frames (over time) of the video, while also accommodating the user's head motions. Additionally, to produce a high-quality video that is registered using facial landmarks, a jitter removal method is utilized to prevent spurious motions in the video caused by the noise in the facial landmark detection process. Then, the eye regions of one or both eyes are automatically estimated, and a set of pixels (called a slice) along the horizontal and vertical directions are selected from the eye region(s) in the video frames. The position and size of the horizontal and vertical slices are automatically determined. Finally, the horizontal and vertical eye movements are derived by processing a time series obtained at each pixel in the horizontal slices and vertical slices, respectively. This non-invasive method for detecting eyeball motion under closed eyelids has low computational complexity and achieves real-time performance. The derived eye movement signals obtained using the method described in this disclosure achieves a good correlation with ground truth electrooculography (EOG) signals of eye movements captured simultaneously during verification testing.

Regarding the non-invasive method for detecting eyeball motion under closed eyelids, the method 300 includes three main components: (1) a technique of smoothing and jitter removal of video registered to remove global motion caused by noisy facial landmarks; (2) a technique of processing shadows in the eye region to reveal (and measure) eyeball motion hidden under closed eyelids; and (3) a prediction technique that classifies REM vs. non-REM sleep stages based on the revealed eyeball motion. In the context of a smart sleep chair, the REM/non-REM sleep stages classified are used to control operation of the smart sleep chair. For example, the smart sleep chair can include a headrest that incorporates the headrest 206 of the system 200.

The method 300 includes processing blocks for video capture 310, face landmark detection 320, face alignment and registration 330, region of interest (ROI) extraction 340, eye movement pre-processing 350, horizontal slice and vertical slice selection 360, shadow processing 370, and machine learning based (ML-based) sleep stage classification 380. At block 310, the camera 204 captures a video 230 of an illuminated face 220. The captured video 230 includes video frames (Frame 1, Frame 2, and Frame 3) associated with different time instants ($t_1$, $t_2$, and $t_3$) of a time series, respectively. The electronic device 101 receives the video 230, for example, raw video footage or original video frames captured while the user was asleep, or the eyelids of the user were closed shut. The scene captured in the field of view of the camera 204 includes the face 220 of the user, which might include twitching movement of facial muscles, and which might include tilting and turning of the face 220 because motion of the head 240 of the user (e.g., global head motion) during capture of the video 230 causes the position and orientation of the face 220 to move relative to the position of the camera 204. In some embodiments, the electronic device 101 receives the video 230 from the camera 204 via the I/O interface 150, for example, via a direct connection. In some embodiments, the electronic device 101 receives the video 230 from the camera 204 via the communication interface 170, for example, via a connection to the network 162.

The camera 204 optics may be focused to capture sharp (well-focused) videos of the user's face. Furthermore, the capture system 200 may include an optical zooming mechanism to produce videos in which the user's face occupies most of the area in the video frame. These capture constraints, which are implemented at block 310, generate sharp facial features in the video 230 that help the subsequent facial landmark detection algorithm (at block 320) to detect and track facial landmarks consistently from previous frame to current frame to subsequent frame. Furthermore, the shadow processing algorithm (at block 370) is improved when there are a larger number of pixels in the eye region (e.g., ROI 342).

At block 320, the electronic device 101 detects a set (L) of facial landmarks on a face in a current video frame. The detected L includes a first eye lash landmark and at least one of: a second eye lash landmark, eyebrow landmarks, or nose landmarks. For example, when the current frame is Frame 1, the electronic device 101 detects a set of facial landmarks on a face 390 as shown in the original Frame 1 301. The set L of facial landmarks in Frame 1 includes eyelash landmarks 322L, eyebrow landmarks 324L, and nose landmarks 326 on the left eye of the face 390. Additionally, the set of facial landmarks in Frame 1 includes eyelash landmarks 322R and eyebrow landmarks 324R on the right eye of the face 390. In some embodiments, the set L includes all of the facial landmarks detected.

Some users have two eyes, for example, as shown in the face 390. Other users have only one eye, for example, a person who wears an eyepatch, or a person who has a pair of eyelids (upper eyelid and lower eyelid) for only one eye. The electronic device 101 calculates an eye centroid 328 based on the set of facial landmarks in the current frame. For example, the electronic device 101 calculates a first eye centroid and a second eye centroid based on the set of facial landmarks corresponding to the two eyes on the face 390 in Frame 1. The electronic device 101 calculates a line 329 joining the two eye centroids, which can be used to set a horizontal axis 329' of the face 390' after alignment.

Figure 4A:
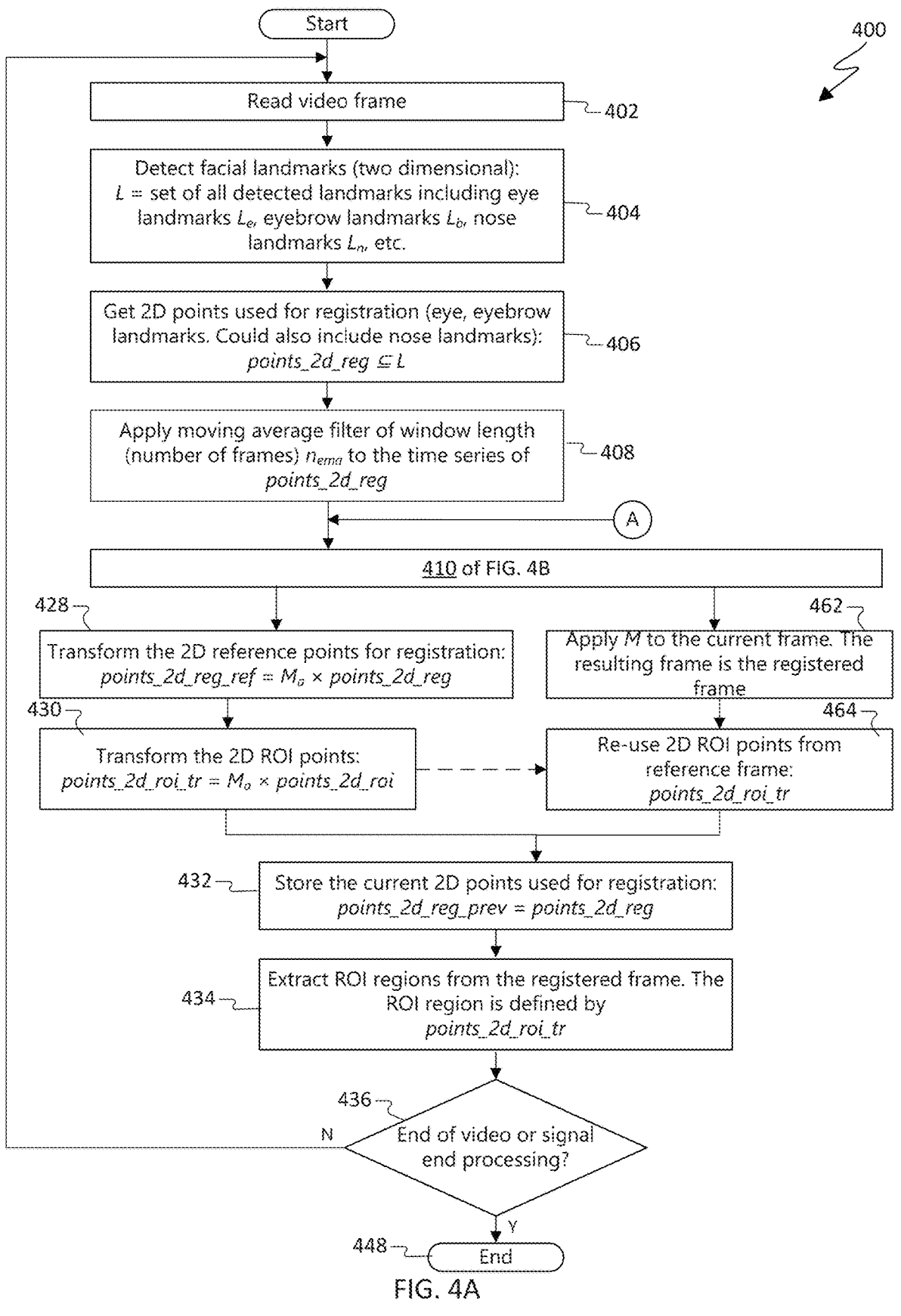
FIG. 4A illustrates a method for face alignment and video frame registration process using facial landmarks, according to this disclosure.

The face alignment and registration at block 330 includes subprocess blocks 332, 334, and 336. The electronic device 101 transforms the original video 230 (including original unaligned frames 301-303) into a registered video 235, which includes the frames 311 and 312 (through the last frame of the video 230) after processed through the face alignment and registration at block 330 (including blocks 332-336). At block 330, the face alignment and registration begin with the electronic device 101 selecting a reference frame. For ease of explanation, from among a plurality of video frames in the video 230, the first video frame (e.g., earliest in time, Frame 1) is selected as the reference frame. It is understood that a subsequent video frame (e.g., later than the first video frame) could be selected as the reference frame. A suitable frame in the video 230 (i.e., a video stream) is selected as a reference frame. For example, if the camera system (e.g., multiple cameras 204) employs optical focusing and zooming mechanisms, then the first frame obtained after a sharply focused and well-zoomed picture is available may be selected as the reference frame. Alternatively, the reference frame could also be the first video frame available following the start of the shadow detection procedure as depicted in FIG. 2. Furthermore, a new reference frame may be chosen periodically or in response to some events. For example, a new reference frame may be selected in response to any significant change in the user's posture. For example, FIG. 4A shows a flowchart of the face alignment and frame registration process.

At block 332, the electronic device 101 performs face alignment on the original frame selected to be transformed into the reference frame, for example, aligning the selected frame (original Frame 1 301) horizontally based on the set (L) of facial landmarks detected. For example, the line 329 joining the two eye centroids of the face 390 can be rotated by an alignment angle θ to an angle of zero degrees (0°) and set as a horizontal axis 329'. Pixels that form the face 390 can be rotated by the same alignment angle θ such that the aligned version of Frame 1 311 shows a face 390' that is aligned upright. Other face alignment techniques can be applied to the selected frame (original Frame 1 301) to generate the face 390' aligned upright in the reference Frame 1 311.

The first main component of the method 300 executes at block 334, namely, the electronic device 101 smoothens the facial landmarks detected. At block 336, the electronic device 101 the determines whether the current video frame is the reference frame, and registers the current video frame with respect to the reference frame in response to a determination that the current frame is not the reference frame. More particularly, at block 336, the electronic device 101 applies an image registration process to non-reference frames, such as when the current frame is (Frame 2 or Frame 3) subsequent to the reference frame. When the image registration process is complete, the non-reference Frame 2 312 shows a face 390" that is aligned upright, and the non-reference Frame 2 312 is registered with respect to the reference Frame 1 311. The image registration process forces the non-registered frame (e.g., original Frame 2 302) to have the same coordinate system as the aligned reference Frame 1 311. However, when the current frame is the reference frame (Frame 1), the electronic device 101 does not apply the image registration procedure of block 336 to the reference frame.

At block 340, the electronic device 101 determines (or extracts) an ROI 342 from the current frame. In some embodiments, the ROI 342 is extracted from the original version of the current frame such that the extracted ROI 342 includes pixels that correspond to an eye in a closed-eye state on the face 390 that is not yet aligned. In some embodiments, the ROI 342 is extracted from the aligned/registered version of the current frame such that the extracted ROI 342 includes pixels that correspond to an eye in a closed-eye state on the aligned face 390' or 390".

At block 350, the electronic device 101 applies eye movement pre-processing to the current frame. More particularly, the eye movement pre-processing is applied to the ROI 342. An example of eye movement pre-processing includes an image contrast enhancement algorithm.

The second main component of the method 300 at block 360, namely, the electronic device 101 selects a horizontal slice 362 and selects a vertical slice 364 from the ROI 342. If the eye movement pre-processing has been applied to the ROI 342, then the horizontal slice 362 and vertical slice 364 are selected from the pre-processed ROI 342'.

At block 370, the electronic device 101 applies a shadow processing algorithm to the ROI 342 (or pre-processed ROI 342'). The bulge of the eyeball under the eyelid of the user casts a shadow that includes shadow outline 366 (e.g., a border of the eyeball bulge's shadow) that is located beneath the eyebrow line and above the eyelid line as shown in the eye ROI 342. The shadow processing algorithm determines an intensity (I) of image contrast that varies over time. The intensity of image contrast as a function of time is denoted as I(t) and is generally referred to as eyeball motion signal 375. Various embodiments of this disclosure provide multiple ways to calculate the intensity I(t) at a particular time instant. Particularly, the electronic device 101 generates the eyeball motion signal 375 by calculating a measured value of a shadow intensity of the eye within at least one of the first vertical slice 364 or the first horizontal slice 362 at the time instant $t_n$ for the current video frame referred to as Frame n (e.g., Frame 1 at time instant $t_1$). The electronic device 101 updates the eyeball motion signal 375 by processing a subsequent video frame (e.g., Frame 2) through the method 300, for example, in a pipeline manner, thereby calculating a subsequent measured value of a shadow intensity of the eye within at least one of the first vertical slice 364 or the first horizontal slice 362 at the subsequent time instant $t_{n+1}$ for the next video frame referred to as Frame n+1 (e.g., Frame 2 at time instant $t_2$).

The electronic device 101 sends the eyeball motion signal 375 to a ML-based sleep stage classifier at block 380, which processes the eyeball motion signal 375 and outputs a sleep stage determination result 385 indicating whether the user is in a REM sleep state. The sleep stage determination result 385 can be a first indicator that the user is in the REM sleep state or a second indicator that the user is in a non-REM sleep state. For simplicity, block 380 is referred to as the ML-based classifier 380, the operation of which is the third main component of the method 300. The ML-based classifier 380 classifies eyeball motion, which is represented by the eyeball motion signal 375, as a REM sleep stage or non-REM sleep stage.

FIG. 4A illustrates a method 400 for face alignment and video frame registration using facial landmarks, according to this disclosure. The embodiment of the method 400 shown in FIG. 4A is for illustration only, and other embodiments could be used without departing from the scope of this disclosure. For ease of explanation, the method 400 is described as being executed by the processor 120 of the electronic device 101.

At block 402, the processor 120 reads a video frame, which is referred to as a current video frame or simply as a current frame. For example, the current video frame is read from a video 230 stored in memory 130 or input as a video stream from the camera 204. The scene captured in the current video frame can include the illuminated face from the video 230.

At block 404, a set of facial landmarks are detected in the reference video frame and subsequent frames, respectively. That is, the procedure of block 404 is applied to the current frame in both cases when the current frame is the reference frame or a non-reference frame. Facial landmarks are distinct points on a face that can be consistently detected to identify and localize features such as some salient points (e.g., corners, mid-points, etc.) of the eyes, lips, nose, eyebrows, etc. These landmarks have two dimensional (2D) or three dimensional (3D) spatial coordinates, usually expressed in pixel units. For ease of explanation, this disclosure provides examples in which each landmark is a pixel location identified by 2D coordinates (e.g., (column, row)). The set of all detected landmarks is denoted as L, including nose landmarks $L_n$, and eye landmarks the can include eyelash landmarks $L_e$ and eyebrow landmarks $L_b$, The eyelash and eyebrow landmarks are examples of eye landmarks, but this disclosure is not limited to these examples, and other eye landmarks could be used.

At block 406, the processor 120 identifies, from among the detected set L of facial landmarks, a subset of registration points to be used to register non-reference frames from the video 230 with respect to a reference frame. The subset of registration points is denoted as points_2d_reg. This identification process is illustrated as points_2d_reg$\subseteq$L. Not all landmarks in the set L are used for face alignment and registration. For example, a first subset of the landmarks on or around the eyes and nose may be used to determine the orientation of the face in the reference frame, while a different overlapping or disjoint subset (points_2d_reg) of the set L of landmarks may be used for the registration of frames with reference to the reference Frame 1 311. In some embodiments, only the subset $L_e$ of landmarks around the eyes are used for defining and extracting the region of interest (ROI) for analyzing the shadow movements. Because the focus of this disclosure is not on facial landmark detection, it is assumed that any standard face landmark detection tool (such as MediaPipe face landmark detection or Dlib technique, etc.) is used in the pipeline that is the method 400. The other processing blocks in the pipeline described in this disclosure are agnostic to the particular face landmark detection tool used.

At block 408, the processor 120 performs smoothening of the detected set L similar to or the same as the procedure performed at block 334 of FIG. 3. That is, the first prong of a three-prong jitter removal process begins at block 408. More particularly, the processor 120 applies a moving average filter that has a window length ($n_{ema}$) to remove noise detected in the set L of wavelengths. The positions of the landmarks in the video 230 may fluctuate randomly about their true positions as a result of several noise factors in the video capture and landmark detection processing pipeline even if the user's face is perfectly stable. To mitigate the effects of such noise, a simple or (windowed) exponential moving average filter of appropriate window size may be applied to the set landmark coordinates. The span (number of frames) of the filter may be chosen based on the degree of severity of the noise present in the landmark coordinates; however, a shorter window is usually preferred. For example, the moving average filter that has a window length ($n_{ema}$) is applied to the time series of points_2d_reg$\subseteq$L (i.e., subset of registration points). For every frame in the video 230, the processor 120 can detect landmarks and apply the moving average filter that smooths those landmark pixel points.

Figure 4B:
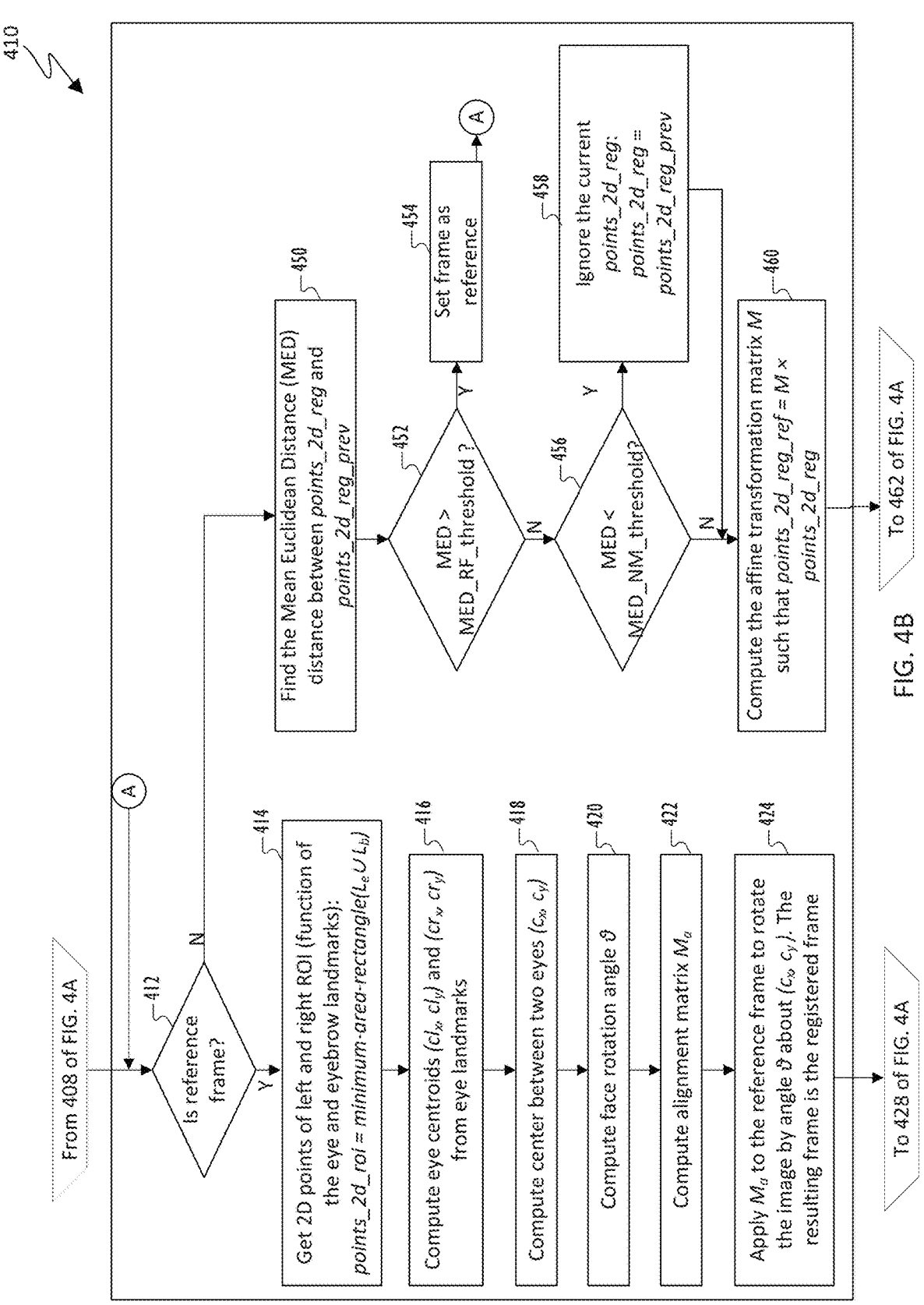
FIG. 4B illustrates a first embodiment of block 410 of FIG. 4A.

At block 410 the processor 120 determines to one of: (Option A) align the current frame as a reference frame to prepare to apply for image registration techniques to non-reference frames; (Option B) replace a reference frame with the current frame as a new reference frame; or (Option C) register the current non-reference frame with respect to the (current or newly selected) reference frame. The second and third prongs of the three-prong jitter removal process are shown in block 410. A first embodiment of block 410 is enlarged as shown in FIG. 4B and includes blocks 412-424 and 450-460. A second embodiment of block 410c is enlarged as shown in FIG. 4C and includes the same blocks 412-424 and 450-460, but rearranged to start at block 414.

Refer temporarily to FIG. 4B. At block 412, the processor 120 determines whether the current video frame is already selected and set as the reference frame. When the processor 120 identifies that a reference frame has not yet been set, then at block 412, the processor 120 can select an initial frame (i.e., Frame 1) to be the reference frame. For example, when Frame 1 is the current video frame, the processor 120 selects and sets Frame 1 as the reference frame, and determines YES that the current video frame (Frame 1) is the reference frame currently set. In response to a determination that the current video frame is the reference frame, the processor 120 determines to (Option A) align the current video frame, and the method 400 proceeds to block 414. The application of a face alignment algorithm to the current video frame is described more particularly at block 414 through block 424, wherein the original Frame 1 301 is used as an example of the current video frame. In response to a determination that the current video frame is not set as the reference frame, the method 400 proceeds to block 450.

At block 414, the processor 120 determines a region of interest (ROI) that includes an eye in a closed-eye state on the illuminated face 390 based on the original Frame 1 301. The ROI is denoted as points_2d_roi, which can be calculated as a function of the eyelash landmarks $L_e$ and eyebrow landmarks $L_b$, such as a minimum-area-rectangle function illustrated as minimum-area-rectangle ($L_e$ Å$L_b$). The procedure performed at block 414 can be the same as or similar to the procedure at block 340 of FIG. 3. In the case of two eyes depicted in the face 390, one ROI is determined for the left eye based on the eye landmarks of the left eye, and another ROI is determined for the right eye based on the eye landmarks of the right eye.

Figure 4C:
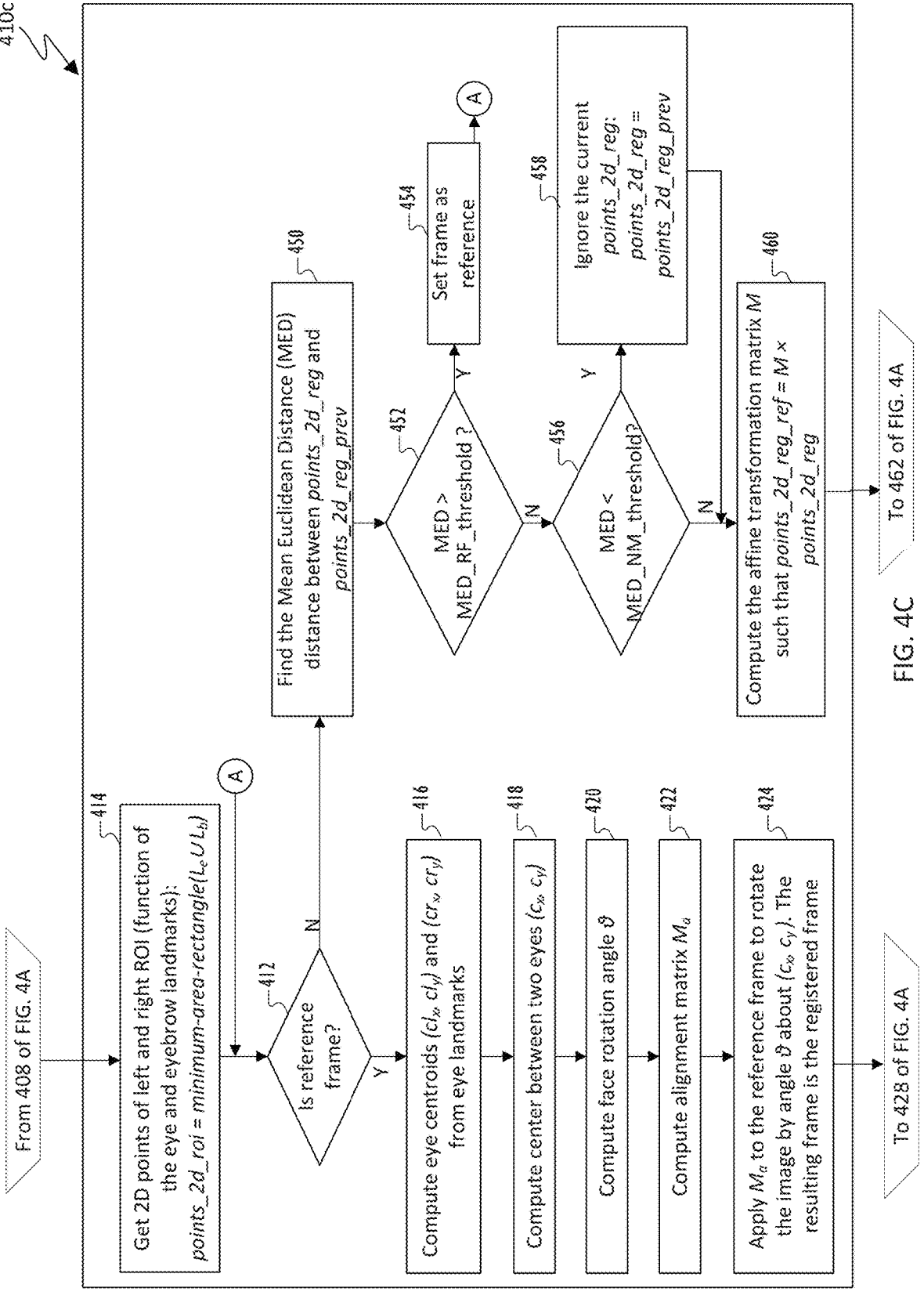
FIG. 4C illustrates a second embodiment of block 410 of FIG. 4A.

Refer temporarily to FIG. 4C. Only the difference between the first and second embodiments of block 410 of FIGS. 4B and 4C is described, and the other components are the same between these two embodiments. In a second embodiment of block 410c of the method 400, the procedure at block 414 is applied to every current video frame (regardless of status as reference frame or non-reference frame) such that the processor executes block 414 after block 408 and before block 412. The ROI vertices—represented by points_2d_roi—are estimated for each frame before face alignment and registration (for frames following the reference frame). Therefore, the ROI vertices will be transformed (at block 430) by the alignment matrix $M_a$ for the reference frame or the affine transformation matrix M for the other frames that are non-reference. This second embodiment of block 410 (illustrated as block 410c) may be adopted when the registration is expected to have some degree of inaccuracy at the cost of a slight increase in processing complexity and lag compared to the pipeline of the first embodiment of block 410 shown in FIG. 4B.

Figure 7:
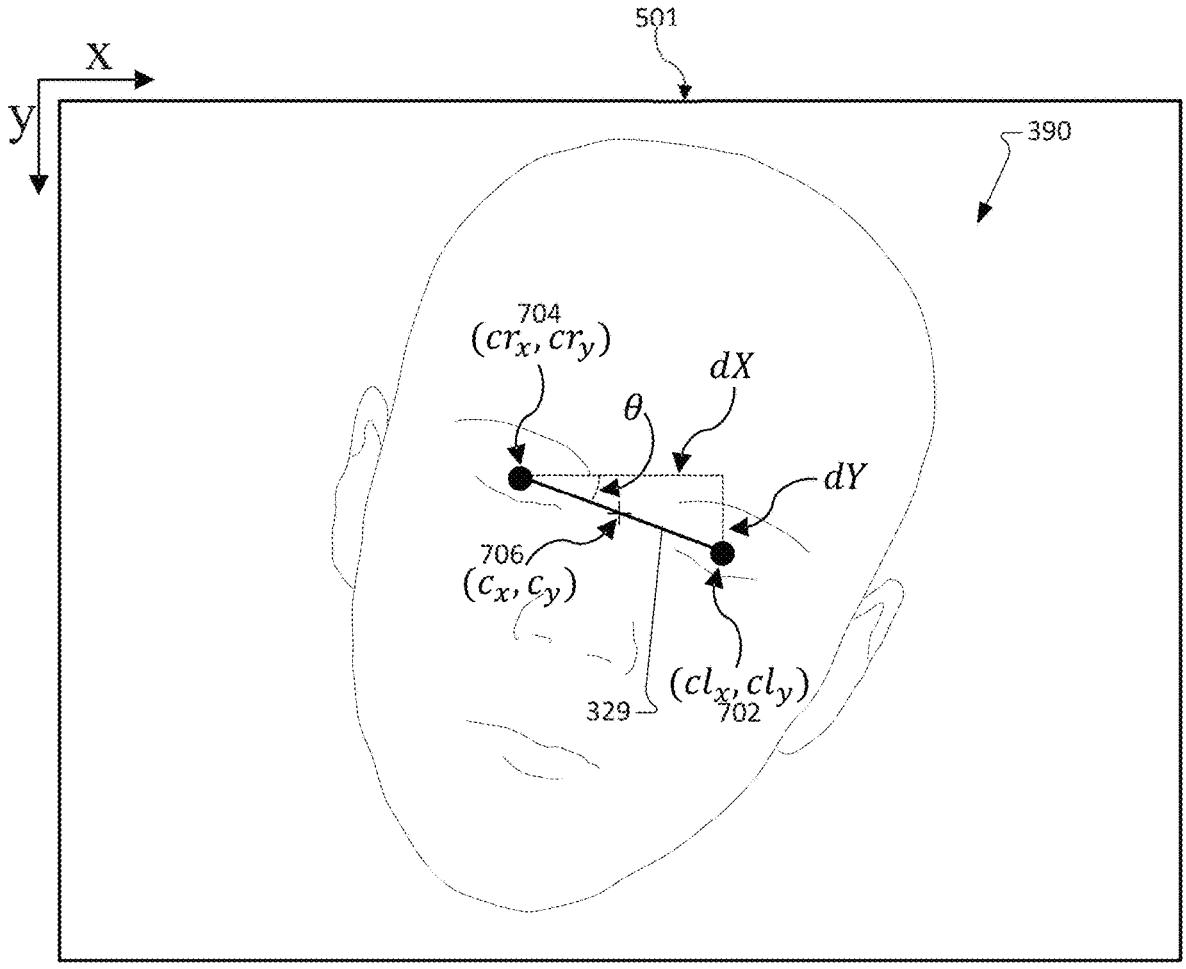
FIG. 7 illustrates an example determination of an angle to rotate the reference frame of FIG. 5 to align the face, according to this disclosure.

Blocks 416-424 are described together with FIG. 7 to describe the face alignment algorithm applied to the frame selected to be the reference frame. At block 416, the processor 120 computes eye centroids based on eye landmarks.

FIG. 7 shows an enlarged view of the eye centroids computed. A left eye centroid located at $(cl_x, cl_y)$ and a right eye centroid located at $(cr_x, cr_y)$ are respectively computed based on the eyelash and eyebrow landmarks of the left eye and of the right eye, respectively.

At block 418, a center $(c_x, c_y)$ between two eyes is computed, and an enlarged view of the center is shown in FIG. 7. At block 420, a face rotation angle θ is computed, which can be the same as the alignment angle θ computed at block 332 of FIG. 3. At block 422, an alignment matrix $M_a$ is computed.

The face alignment technique aligns the current video such that the illuminated face has a specified eye orientation. As an example, the specified eye orientation could be that two eyelash landmarks are horizontally colinear (on the same row of pixels) with each other, and that the two eyelash landmarks can be from the same eye or from different eyes. As another example, the specified eye orientation could be that a nose landmark 326 is on a row below or that an eyebrow landmark 324L or 324R is on a row above a first eyelash landmark on a first eye and/or a second eyelash landmark on a second eye.

At block 424, the processor 120 applies the alignment matrix $M_a$ to the current frame (e.g., the reference frame) to rotate the image by the face rotation angle θ and about the computed center $(c_x, c_y)$ between the two eyes. The resulting frame is the aligned version of the reference frame (that depicts the aligned face 390' of Frame 1), such that the electronic device is not prepared to apply an image registration algorithm to non-reference frames when later read at block 402 at another iteration of the method 400.

The method 400 proceeds from block 424 of FIG. 4B to block 428 of FIG. 4A. First, a portion of the method 400 is described in an example scenario when the original Frame 1 301 from the video 230 is processed through the pipeline of this method 400. Then, the remainder of the method 400 is described in a scenario when the original Frame 2 302, as a subsequent video frame from the video 230, is processed through the pipeline of this method 400 following the processing of original Frame 1 301.

Refer back to FIG. 4A. At block 428, the processor 120 transforms the subset of reference points for the current frame (points_2d_reg), which are the reference points for Frame 1, into the registration points of the reference frame (points_2d_reg_ref). The transformation includes multiplying the alignment matrix $M_a$ by the current frame's reference points (illustrated as $M_a \times$points_2d_reg). As a result of the application of the alignment matrix to the current frame's reference points, the aligned version of Frame 1 311 is generated from the original Frame 1 301 transformed and can then be used the reference frame.

More particularly, the subset of registration points (points_2d_reg) is used for registering the non-reference frames 302-303 subsequent to the not-yet-aligned reference frame (e.g., original Frame 1 301) in the video 230, and the registering is with respect to the reference Frame 1 311 after face alignment. In some embodiments, landmarks $L_e$ and $L_n$ from the eyes and nose are selected (for inclusion within points_2d_reg) to be used for frame registration. Alternatively, if the processor 120 determines that the 2D coordinates of the nose landmarks $L_n$ are too noisy (or expected to be too noisy), then the processor 120 can select only the landmarks $L_e$ from the eye regions (for inclusion within points_2d_reg) to be used for frame registration. In any case, only the 2D spatial coordinates of the selected facial landmarks (i.e., subset of registration points points_2d_reg) are used for registration purposes. Because these landmarks among a subset of registration points points_2d_reg were detected in the reference Frame 301 before the face alignment transformation (via matrix $M_a$) was applied (or were detected in a non-reference Frame 2 302 before a registration transformation (via affine matrix M is applied), the points_2d_reg will be transformed (multiplied) by the alignment matrix $M_a$ to generate the reference registration points points_2d_reg_ref. Subsequent video frames (302-303) are registered with respect to the reference video Frame 1 311 by first detecting the same set of the facial landmarks in the current frame to generate the set of registration points points_2d_reg. Then, an affine transformation matrix M is estimated such that points_2d_reg_ref=M×points_2d_reg. Finally, warping the current frame using the affine transformation matrix M generates the registered frame.

At block 430, the processor 120 transforms the points in the ROI (points_2d_roi) into a transformed ROI (points_2d_roi_tr), by multiplying the alignment matrix (illustrated as points_2droi_tr=$M_a \times$points_2d_roi). The points in the ROI can be denoted as points_2d_roi, as defined in block 414, and include the landmarks of the eyes. The transformed ROI points_2d_roi_tr is stored in memory to be reused in processing a subsequent frame of the video 230 though a reiteration of the method 400.

At block 432, the processor 120 stores a points_2d_reg_prev parameter, which denotes the current 2D points used for registration, and sets the parameter value to be equivalent to the subset of registration points of the current frame (points_2d_reg), which are points from the reference frame (aligned Frame 1 311).

At block 434, the processor 120 extracts ROI regions from the reference Frame 1 311 that is ready to be used to apply image registration to other non-reference frames. The ROI region can be defined by points_2d_roi_tr, which was determined at block 430.

At block 436, the processor 120 determines whether to reiterate the method 400 for another video frame or to proceed to the end 448 of the method 400. For example, the method ends 448 if the processor 120 determines that the current frame is the end of the video 230. Also, if the processor 120 determines to end signal processing, then the method ends 448. In the case that original Frames 2 and 3 302 and 303 follow the current Frame 1 301 in the video 230, at block 434, the processor 120 determines to restart the method 400.

Now the remainder of the method 400 is described using a scenario when the original Frame 2 302, as a subsequent video frame from the video 230, is processed through the pipeline of this method 400 as the current frame, and using the aligned Frame 1 311 as the reference frame currently set. The procedures of blocks 402-408 are repeated as described above, so the descriptions are not duplicated here.

Refer back to FIG. 4B. At block 412, the processor 120 determines that the current frame (original Frame 2 302) is not the reference frame currently set. The procedure of block 450 is executed after a determination has been made that the current video frame is not set as the reference frame, and thus Frame 2 will not undergo the face alignment algorithm described with blocks 416-424. In some embodiments of the method 400, the procedure of block 414 is applied to the current frame (Frame 2) that is a non-reference frame, prior to executing procedure of block 450. At block 450, the processor 120 determines (e.g., calculates) a mean Euclidean distance (MED) between points_2d_reg and points_2d_reg_prev, which are the MED from the subset of registration points of the current video frame to the subset of registration points of a previous video frame, respectively.

More particularly, the detected set L of facial landmarks usually includes some amount of noise in the estimated positions which may result in unwanted movements (jitter) in the registered video 335 even when the user's face is perfectly fixed. Experimental observation shows that even small fluctuations (due to noise) in the position estimates of the facial landmarks can result in significant (consequential) shifts or scaling of the registered video frames. To prevent such spurious motions in the video and produce a high-quality video 335 registered using facial landmarks, an embodiment of this disclosure utilizes a three-pronged jitter removal method.

The first prong of jitter removal includes treating the detected landmarks L as a set of time series and applying a windowed moving average filter to smoothen the $L_{n_{ema}}$ landmark signals. The detected landmarks L as a set of time series can be $\{L_1, L_2, \ldots L_{n_{ema}}\}$, which are detected within the window length $n_{ema}$ from a set of frames {Frame 1, Frame 2, ... Frame $n_{ema}$} respectively captured at respective times $\{t_1, t_2, \ldots t_{n_{ema}}\}$. Examples of the windowed moving average filter include a simple moving average filter or an exponential moving average filter. Alternatively, outlier detection and filtering may also be used. Moving average filtering or outlier rejection of the detected landmarks L do not completely remove all jitter, but do alleviate and remove jitter to some degree.

The second and third prongs of the jitter removal process are described more particularly with blocks 452 and 456. Ideally, if there is no new actual movement of the user's head 240 and the (small) changes in the landmark positions are a result of the noise in the system 200, then these changes in the position of the landmarks (for example, $L_2$ is different from $L_1$ by a small change) should be rejected and no new affine transformation matrix M should be computed. Instead, the transformation matrix used to warp the previous frame should be used for warping the current frame. In an alternative embodiment, the affine transformation matrix M used to warp the current frame may be derived from the same set of registration points points_2d_reg used in the previous frame, as shown by the method 400 proceeding from block 458 to block 460.

At block 452, the processor 120 determines whether to (Option B) replace a reference frame with the current frame as a new reference frame. The method 400 proceeds to block 454 in response to a determination that a face-realignment threshold condition is satisfied, for example, when the MED from the subset of registration points of the current video frame to the subset of registration points of the reference frame currently set, respectively exceed a face-realignment threshold value (i.e., MED>MED_RF threshold is TRUE). The method 400 proceeds to block 456 in response to a determination that a face-realignment threshold condition is not satisfied (i.e., MED>MED_RF threshold is FALSE).

At block 454, in response to a determination that a face-realignment threshold condition is satisfied, the processor 120 sets Frame 2 as a new reference frame and thereby updates or replaces (Frame 1) as the reference frame. The encircled A illustrates that the method 400 returns to block 412 after block 454.

At block 456, the processor 120 determines whether to (Option C) register the current non-reference frame with respect to the reference frame (current set or newly set). The method 400 proceeds to block 458 in response to a determination that an expected-noise threshold condition is satisfied, for example, when the MED is less than an expected-noise threshold value (MED<MED_NM_threshold is TRUE). The method proceeds to block 460 in response to a determination that the expected noise threshold condition is not satisfied (MED<MED_NM_threshold is FALSE).

At block 458, the registration points of the current frame (points_2d_reg) are ignored or discarded. To discard the registration points of the current frame, the processor 120 sets the points_2d_reg parameter to be equivalent to the registration points of the previous frame (points_2d_reg_prev). For example, the registration points of Frame 2 are replaced using the registration points of Frame 1.

At block 460, the processor 120 computes an affine transformation matrix (M) such that a multiplication product of the affine transformation matrix M by the subset of registration points of a previous video frame, when the method 400 proceeds from block 458 to block 460. However, when method 400 proceeds from block 456 to block 460, then at block 460, the processor 120 computes the affine transformation matrix M such that a multiplication product of the M by the subset of registration points of the current video frame (points_2d_reg) is equivalent to the subset of registration points of the reference frame currently set (points_2d_reg_ref). In another embodiment of this disclosure, moving average filtering may be applied to the elements of the affine transformation matrix M in addition to or instead of the exponential moving average filtering of the landmark positions.

The second prong of the jitter removal method is implemented as described more particularly below. The set of registration points points_2d_reg is stored in memory for every frame as points_2d_reg_prev, including the reference frame. For the current frame (excluding the reference Frame 1 311), the mean of the Euclidean distances (MED) between the corresponding registration points in the current frame (points_2d_reg) and the previous frame (points_2d_reg_prev) are computed. If the MED is less than a set threshold value, denoted as the MED_NM_threshold, then the registration points in the current frame are ignored. Instead, the registration points from the previous frame are used for the computation of the affine transformation matrix M used to warp the current frame to register it to the reference frame. The MED_NM_threshold has units of pixels and it is usually a small value depending on the expected amount of noise in the video capture and landmark detection processing algorithm. The MED_NM_threshold usually should be a small value, for example, between 3-5 pixels. However, if small movements of the user's face are present among the window of $n_{ema}$ frames, then the MED is expected to be higher than the small value of the MED_NM_threshold and a new transformation matrix M will be calculated to register the current frame to the reference frame.

This third prong of the three-pronged jitter removal method is implemented as described more particularly below. If the displacement of the user's face is very large, for example, if the user turns or shifts the head position by a large amount, then registering the face to the reference Frame 1 311 obtained in the previous head position may cause large distortions in the facial image. Therefore, instead of using the current reference frame to register the current video frame (or other subsequent video frames), the algorithm discards the current reference frame and assigns the current video frame as the new reference frame. That is, the processor 120 assigns a current frame as the new reference frame if the MED is greater than a set threshold denoted as MED_RF_threshold. The face orientation of the new reference frame is recomputed, and face alignment procedure is carried out once again, as shown by the encircled A returning to reiterate the procedure of block 410. Frames after the new reference frame are registered to the new reference frame.

The method 400 proceeds from block 460 of FIG. 4B to block 462 of FIG. 4A, at which the processor 120 applies the affine matrix M to the current frame (original Frame 2 302). The resulting frame is a registered frame, namely, the registered version of Frame 2 312 that depicts the aligned face 390" of FIG. 3. The registered Frame 2 312 is registered with respect to the reference Frame 1 311.

At block 464, the processor 120 obtains and reuses the points_2d_roi_tr, which denotes the 2D ROI points from the reference Frame 1 311. In this scenario, the reference frame remains unchanged, and the method 400 can proceed from block 464 to block 432, followed by block 436. The descriptions of blocks 434, 436, and the end 448 are not duplicated and are similar for the initial and subsequent frames alike.

Figure 5:
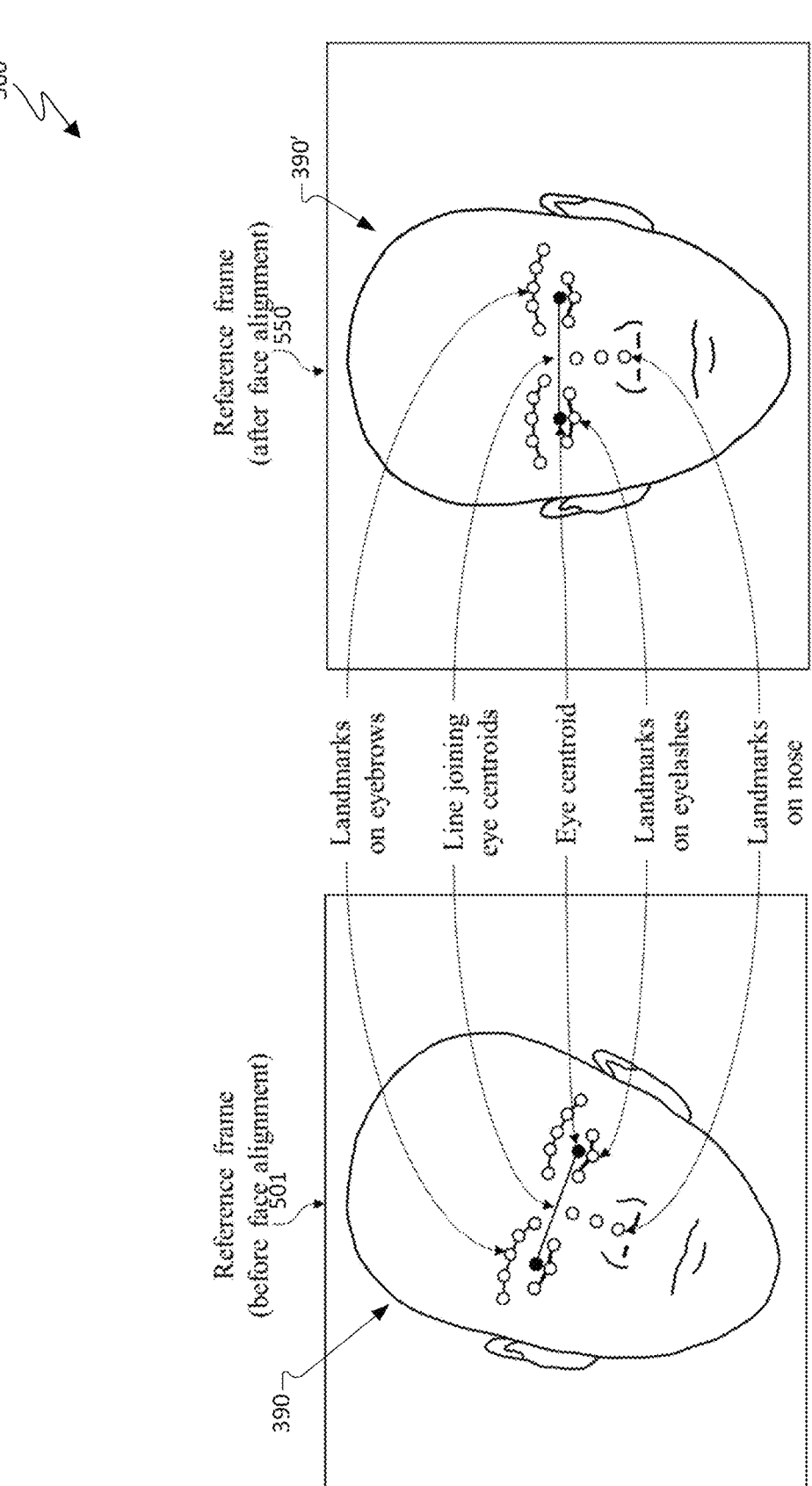
FIG. 5 illustrates an example face alignment of reference frame using facial landmarks, according to this disclosure.

FIG. 5 illustrates an example face alignment transformation 500 of reference frame using facial landmarks, according to this disclosure. The embodiment of the reference frame 501 before face alignment and the reference frame 550 after face alignment shown in FIG. 5 are for illustration only, and other embodiments could be used without departing from the scope of this disclosure. The reference frame 501 before face alignment can be the same as the original Frame 1 301 of FIG. 3 that depicts the unaligned face 390 before alignment. The reference frame 550 after face alignment can be the same as the aligned Frame 1 311 of FIG. 3 that depicts the aligned face 390'. The face alignment transformation 500 is performed at block 330 of FIG. 3 and in the method 400 for face alignment and video frame registration using facial landmarks of FIG. 4A.

In the before and after alignment, the reference frames 501 and 550 include landmarks on eyebrows, lines joining eye centroids, eye centroids, landmarks on eyelashes, and landmarks on the nose. For example, each of the left eye and the right eye includes five eyebrow landmarks, three eyelash landmarks, and one eye centroid.

In the face alignment procession, a set (L) of landmarks on or around the eyes, eyebrows, and noise are detected in the reference frame 501 before alignment. The orientation of the user's face in the video frame can be detected from the landmark locations. For example, the left and the right eyes' centroids may be computed from the set of landmarks detected around the left and the right eyes even when the eyes are closed. The eye centroid of a closed eye may be defined as the average of the 2D or 3D coordinates of the set of landmarks on the eyelashes and eyebrows. Alternatively, the eye centroid of a closed eye may be defined as the average of the 2D or 3D coordinates of the set of landmarks on the eyelashes only.

Figure 6:
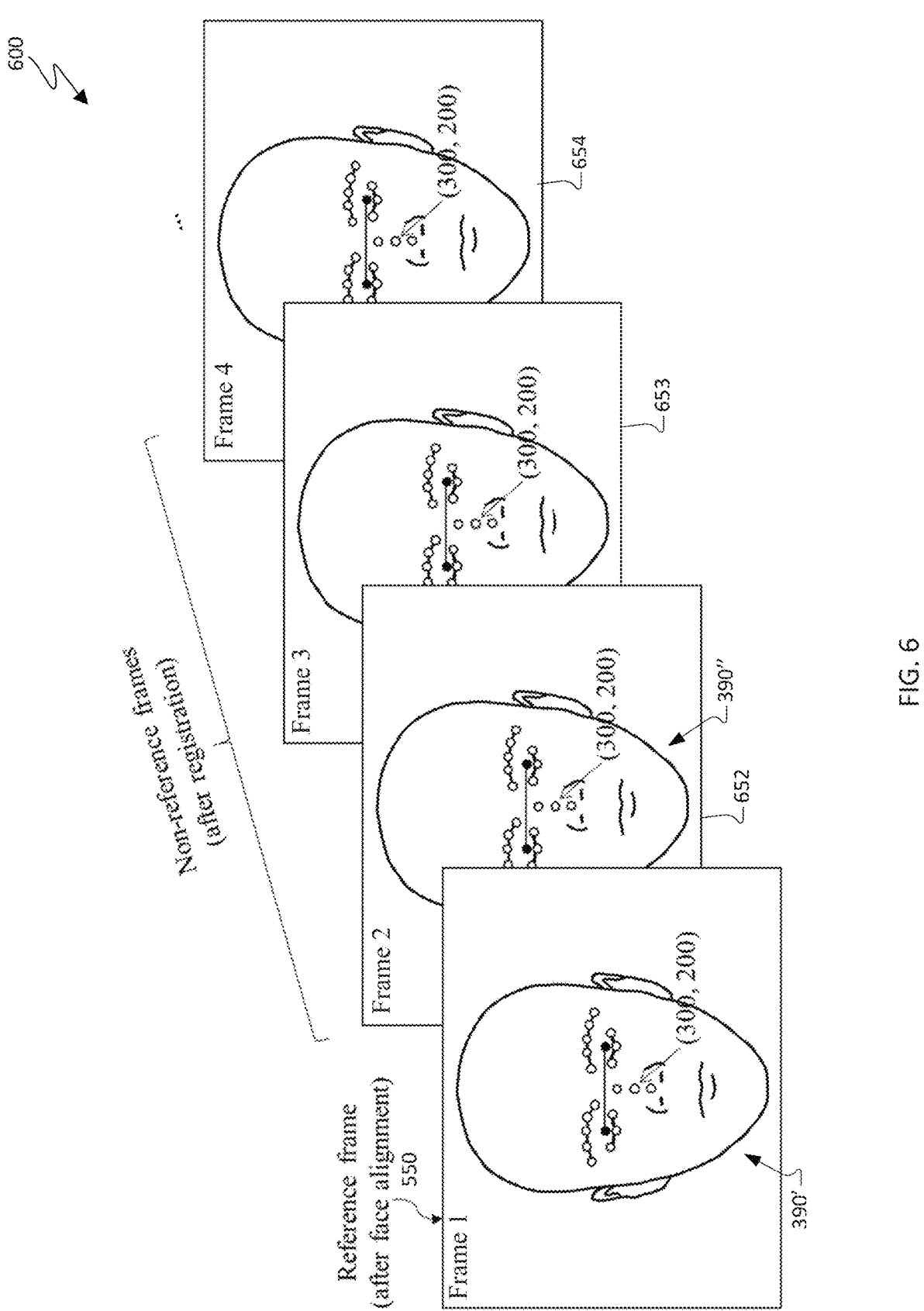
FIG. 6 illustrates registration of subsequent non-reference frames with relation to the aligned reference frame of FIG. 5, according to this disclosure.

FIG. 6 illustrates an example registration 600 of subsequent non-reference frames with relation to the aligned reference frame 550 of FIG. 5, according to this disclosure. The embodiment of the registration 600 shown in FIG. 6 is for illustration only, and other embodiments could be used without departing from the scope of this disclosure. The image registration 600 is performed at block 330 of FIG. 3 and in the method 400 for face alignment and video frame registration using facial landmarks of FIG. 4A.

The reference frame 550 after face alignment can be the same as the aligned Frame 1 311 of FIG. 3. The non-reference frames after registration 652-654 can be the same as the registered Frame 2 312 that depicts the aligned face 390", and registered versions of Frame 3 303 and beyond, respectively. The image registration process forces the non-registered frames (e.g., original Frame 2 312 of FIG. 3) to have the same coordinate system as the reference frame 550 after alignment. That is, when the middle nose landmark among the three nose landmarks is located at (300, 200) in reference frame 550 after alignment, then the middle nose landmark of the non-reference frames 652-654 after registration are forced to be located at the same coordinates (300, 200).

The face alignment together with the registration process (block 330 of FIG. 3 or method 400 of FIG. 4A) simplifies the rest of the processing pipeline (e.g., blocks 350-380 of FIG. 3), which is a technical advantage that reduces consumption of computer resources. For example, during shadow movement analysis (block 370), the location and size of the slice (362 or 364) remains fixed over time. Small motions of the user's head 240 can be effectively removed, if the face 390 is aligned and frames 652-654 are registered, so, the slice location and size need not be changed (e.g., computed) for every frame.

Frame registration (for example, method 400) is not equivalent to video stabilization. The goal of video stabilization is to remove or smoothen the jitter in the relative motion between the objects in the scene and the camera. In comparison, the goal of frame registration is global alignment (namely, removal of global motion) that ensures that the position, orientation, and scale of object features in the video frames remain fixed (or close to remaining fixed) over time within the set of registered frames. This consistency among the set of registered frames captured at different time instants and transformed after the frame registration forces a feature (such as a specific eyelash landmark 322L) of an object (such as the face 390) to be found in the same spatial location (i.e., identical pixel coordinates) in the set of registered frames (such as the set {550, 652, 653, 654} of FIG. 6).

FIG. 7 illustrates an example calculation 700 of an alignment angle $\theta$ to rotate the reference frame 501 of FIG. 5 to align the face 390, according to this disclosure. The embodiment of the calculation 700 of the alignment angle $\theta$ shown in FIG. 7 is for illustration only, and other embodiments could be used without departing from the scope of this disclosure. The alignment angle calculation 700 is performed at block 330 of FIG. 3, and can be the same as the procedure at block 420 in the method 400 for face alignment and video frame registration using facial landmarks of FIG. 4A. To avoid duplicative descriptions, the example calculation 700 utilizes the line 329 joining the left and right eye centroids of in FIG. 3.

The left eye centroid 702 is located at ($cl_x$, $cl_y$), and the right eye centroid 704 is located at ($cr_x$, $cr_y$). Following the computation of the centroids, the orientation of the line 329 joining the left and right eye centroids 702 and 704 can be determined from the two points. The orientation of the line 329 is the angle $\theta$ with respect to the horizontal rows of pixels in the image (i.e., reference frame 501 before face alignment). An arrow labeled with the symbol "$\theta$" illustrates a rotational direction of misalignment, which is from a horizontal axis of the pixel rows of the reference frame 501 to the line 329. The orientation of the line 329 joining the two centroids can be ascribed to the orientation of the face 390 in the reference frame 501. Once the angle $\theta$ is computed, the reference frame 501 is rotated by this angle $\theta$ in the opposite direction (that is opposite to the rotational direction of misalignment) about the center 706 of the two eyes (the center of the line joining the two centroids) to rotate the face 390 upright in the reference video frame 550 after alignment. The center 706 that bifurcates the line 329 between the eye centroids 702 and 704 can be ascribed to the center of the two eyes of the face 390.

The processor 120 (executing the procedure of block 420 of FIG. 4B) calculates the alignment angle θ according to the arctangent function of Equation 1, where $(cl_x, cl_y)$ and $(cr_x, cr_y)$ respectively denote the 2D coordinates of the left-eye and right-eye centroids, the line 329 defines the hypotenuse, dY denotes the length of the opposite side of the alignment angle θ, and dX denotes the length of the adjacent side of the alignment angle θ. The processor 120 can calculate dY and dX according to Equation 2 and Equation 3, respectively.

$$\theta = \arctan\left(\frac{dY}{dX}\right) \quad (1)$$

$$dY = cr_y - cl_y \quad (2)$$

$$dX = cr_x - cl_x \quad (3)$$

The processor 120 (executing the procedure of block 418 of FIG. 4B) determines the center 706 of the two eyes, which is located at the $(c_x, c_y)$ coordinates, by averaging the coordinates of the left and right eye centroids. The x-coordinate of the center 706 is denoted as $c_x$ and is calculated as shown in Equation 4. The y-coordinate of the center 706 is denoted as $c_y$ and is calculated as shown in Equation 5.

$$c_x = \text{int}\left(\frac{cl_x + cr_x}{2}\right) \quad (4)$$

$$c_y = \text{int}\left(\frac{cl_y + cr_y}{2}\right) \quad (5)$$

This rotation about the center 706 of the two eyes is performed (executing the procedure of block 424 of FIG. 4B) by applying the alignment matrix $M_a$ to the image coordinates X, in accordance with Equation 6.

$$X' = M_a X \quad (6)$$

The processor 120 (executing the procedure of block 422 of FIG. 4B) determines the alignment matrix $M_a$ according to Equation 7, where $\alpha = \cos(\theta)$, and $\beta\beta = \sin(\theta)$. The alignment matrix $M_a$ is an example of a transformation matrix. Note that no scaling change is applied during this transformation. Subsequent transformations (such as the procedure of block 462 of FIG. 4A), when subsequent frames (652-654) are registered to the face-aligned reference frame 550, include the scale component. Thus, the face 390' is aligned in the reference Frame 1 311, 550 after alignment.

$$M_a = \begin{bmatrix} \alpha & \beta & (1-\alpha)\cdot c_x - \beta\cdot c_y \\ -\beta & \alpha & \beta\cdot c_x + (1-\alpha)\cdot c_y \\ 0 & 0 & 1 \end{bmatrix} \quad (7)$$

Figure 8:
FIG. 8 illustrates region of interest (ROI) zones, vertical slices, and horizontal slices for shadow movement analysis, according to this disclosure.
Figure 8:
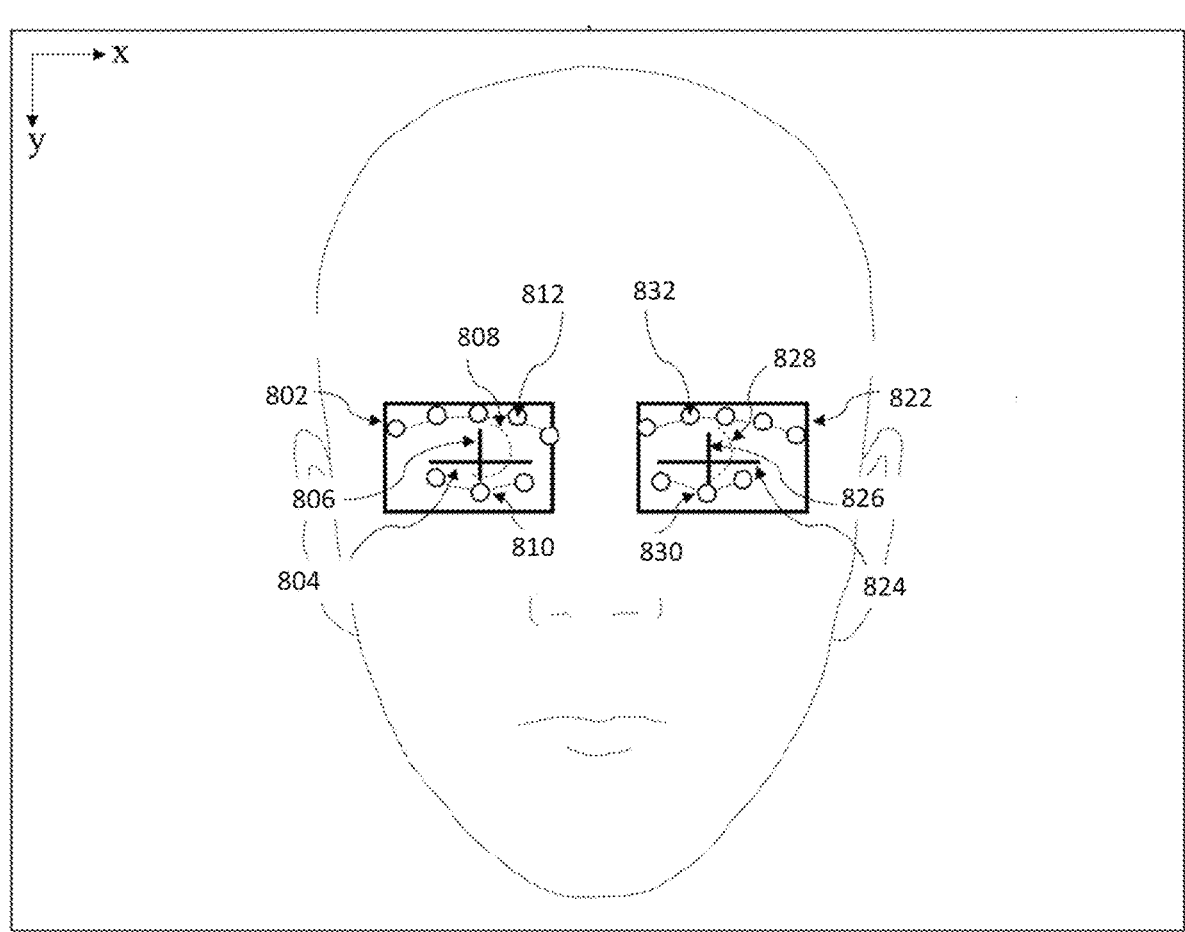

FIG. 8 illustrates example region of interest zones (ROI), vertical slices, and horizontal slices for shadow movement analysis in an aligned/registered video frame 800, according to this disclosure. The embodiment of the video frame 800 shown in FIG. 8 is for illustration only, and other embodiments could be used without departing from the scope of this disclosure.

To avoid duplicative descriptions, the example video frame 800 can be the same as the reference Frame 1 311 or 550 after alignment shown in FIGS. 3 and 5. The example video frame 800 can represent the registered Frame 2 312 of FIG. 3 or any among the non-reference video frames 652-654 after registration with respect to the reference frames 511 or 550 shown in FIG. 6. Each of the ROIs 802 and 822 and their respective components (horizontal slices 804 and 824, vertical slices 806 and 826, shadow outlines 808 and 828, right eyelid landmarks 810, left eyelid landmarks 830, right eyebrow landmarks 812, and left eyebrow landmarks 832) can be the same as or similar to the eye ROI 342 and its corresponding components (362, 364, 366, 322R, 322L, 324R, and 324L) of FIG. 3.

In some embodiments, the processor 120 determines a right eyebrow line as a curve that connects the multiple eyebrow landmarks within the right eye ROI 802. A linear regression can be performed based on the five eyebrow landmarks 812 within the right eye ROI 802. The processor 120 determines a right eyelash line as a curve that connects the multiple eyelash landmarks within the right eye ROI 802. A left eyebrow line and left eyelash line could be determined in a similar manner for the left eye ROI 822.

The eye ROIs 802 and 822 extracted from the video frame 800 can be extracted executing the procedure at block 340 of FIG. 3, and can be the same as the procedure at block 414 in the method 400 of FIG. 4. In the embodiment shown in FIG. 8, the electronic device 101 determines and extracts the ROIs 802 and 822 around the eyes from the face-aligned and registered video frames 311-312. Because the video frames have been registered before ROIs are extracted, the electronic device 101 can determine the location (image coordinates) and dimensions (in pixel units) of the ROI zones in the reference frame 311, 501, 800. The subsequent group of video frames that are registered with respect to a reference frame can re-use the same location and dimension information for extracting the ROI zones without re-determining (via consumption of computing resources) the ROI in every frame. If, and when, a new reference frame is set (or defined), the electronic device 101 re-computes the location and dimension of the ROIs that will be reused by the next set of video frames.

Figure 10:
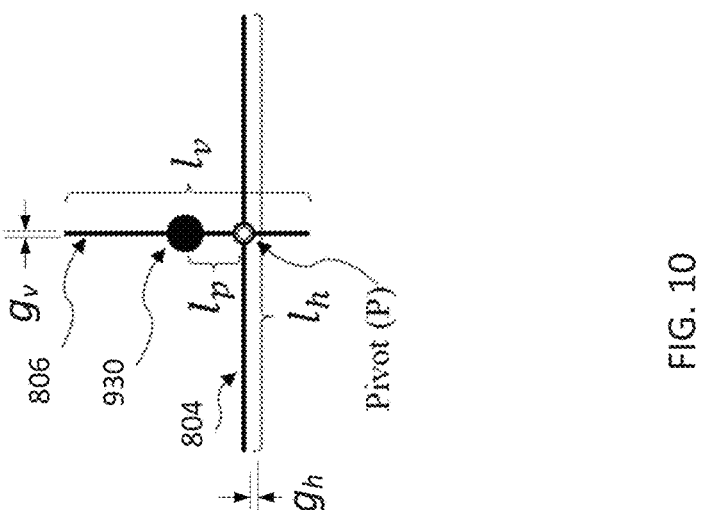
FIG. 10 illustrates dimensions of the slicing parameters of FIG. 9.
Figure 9:
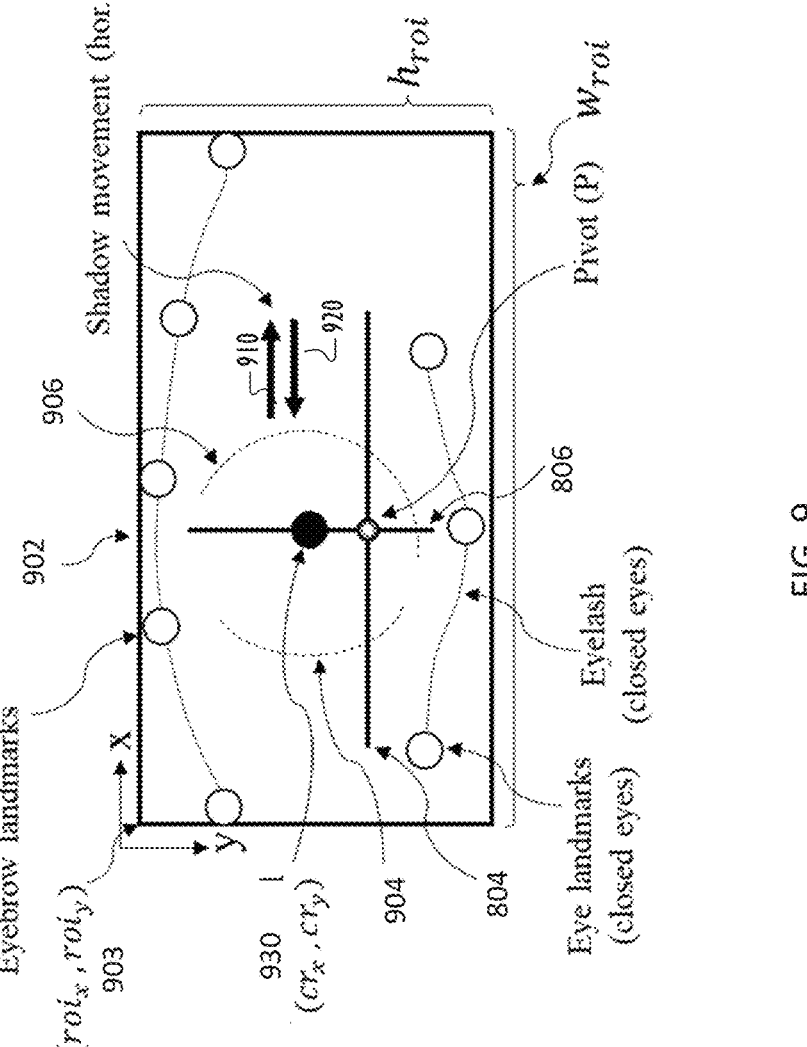
FIG. 9 illustrates features and slicing parameters for shadow processing in the ROI, according to this disclosure.

FIG. 9 illustrates features and slicing parameters for shadow processing in the ROI 900, according to this disclosure. FIG. 10 illustrates dimensions of the slicing parameters of FIG. 9. The embodiment features and slicing parameters of the ROI 900 shown in FIGS. 9 and 10 are for illustration only, and other embodiments could be used without departing from the scope of this disclosure. To avoid duplicative descriptions, the ROI 900 is described as being the same as the right eye ROI 802 extracted from the frame 800 of FIG. 8, but also can represent other ROIs of an aligned/registered frame. The ROI 900 includes the features corresponding to the right eye ROI 802 of FIG. 8, such as the slices 804 and 806.

The location and dimensions of each of the ROIs 802 and 822 are computed as a function of the locations of the landmarks in the eye region, especially the eyelash landmarks $L_e$ and eyebrow landmarks $L_b$. In an embodiment of this disclosure, the ROI for each eye is the minimum-area-rectangle 902 enclosing all the landmarks from the corresponding eye and the eyebrow and with a pair of parallel sides that are parallel to the horizontal and vertical axes of the frame, respectively. The x-axis and y-axis of the ROI 900 depicts the horizontal axis and the vertical axis of the frame, respectively. In some embodiments, the ROIs may also be obtained by adding a small offset (in pixels) to all sides of the minimum-area-rectangle.

The width $w_{roi}$ of the ROI defines the width of the pair of parallel sides that are parallel to the horizontal x-axis of the frame. Analogously, the height $h_{roi}$ of the ROI defines the height of the pair of parallel sides that are parallel to the vertical y-axis of the frame.

The ROI location is denoted as the location $(roi_x, roi_y)$ of a vertex 903 at the top left corner of the ROI 900. The landmarks L are detected from and consequently the ROI vertices—denoted as points_2d_roi—are extracted from the reference Frame 1 301 before the face alignment (method 400 of FIG. 4) is performed. Note that the landmarks L are used for the face alignment (e.g., method 400). The vertices of the ROI extracted from the original reference Frame 1 301 (before face alignment) are transformed by the alignment matrix $M_a$ to obtain the ROI 900 (including vertex 903) of an aligned eye region after the face alignment. In the first embodiment of block 410 (FIG. 4B) of the method 400, the ROI regions for the left and right eyes are determined once for every reference frame. In an alternate embodiment of block 410c (FIG. 4C) of the method 400, the ROI regions for the left and right eyes are estimated from the eye and eyebrow landmarks $L_e$ and $L_b$ in every frame. That is, the frequency at which the vertex 903 is recomputed depends on whether the ROI is extracted from every frame or only reference frames.

The hidden eyeballs produce a small protrusion (or bulge) on the surface of the closed eyelids. When light is cast on the eyes from one side of the eye/face, a small shadow of the bulge is produced on the surface on the other side of the light source. Also, depending on the skin type of the user, a specular highlight 904 (i.e., a small bright region) may be formed near the bulge on the opposite side of the shadow outline 906.

In this example, the eyes are illuminated from the left side of the user's face, which produces a shadow (having shadow outline 906) that the bulge casts on the right side of the bulge, from the point of view of the user. As the hidden eyeball moves in horizontal directions 910, 920 right and left, the shadow follows. In FIG. 9, when the eyeball moves horizontally from the user's right toward the user's left, the eyeball moves in a first horizontal direction 910. When the eyeball moves horizontally from the user's left toward the user's right, the eyeball moves in a second horizontal direction 920 that is opposite to the first horizontal direction 910.

The location of the eye centroid 930 is denoted as the pixel location $(cr_x, cr_y)$ for the right eye. In other embodiments, in the case that the ROI 900 represents a left eye ROI, the location of the eye centroid 930 is denoted as the pixel location $(cl_x, cl)$ for the left eye.

Refer to FIG. 10, which shows the parameters of the horizontal slice 804 and vertical slice 806, namely, two slices for processing the shadows. The $l_h$ and $g_h$ parameters and the $l_v$ and $g_v$ parameters denote dimensions of the slices 804 and 806, respectively. The vertical slice 806 spans vertically a height $l_v$ that is several pixels (or rows) and spans horizontally a thickness (or girth) $g_v$ that is 1-2 pixels (or columns). The horizontal slice 804 spans horizontally a width $l_h$ of the several pixels (or columns) and spans vertically a thickness $g_h$ that is 1-2 pixels (or rows). The parameters $l_v$ and $l_h$ of the vertical and horizontal slices, respectively, are measured in term of pixels and can be specified as a percentage of the ROI height $h_{roi}$ and width $w_{roi}$, respectively.

The horizontal and vertical slices 804 and 806 can be pivoted about a pivot P point. The parameter $l_p$ denotes a location of the slices relative to the pivot P and relative to the eye centroid 930. Particularly, the horizontal slice 804 intersects the vertical slice 806 at the pivot P located $l_p$ pixels from the eye centroid 930. The location of the pivot P along the vertical slice 806 can be specified by the parameter $l_p$, which stores a value measured in terms of pixels or measured as a percentage of the ROI height $h_{roi}$. The sign of $l_p$ determines whether P is above (if $l_p$ is negative) or below (if $l_p$ is positive) the location $(c_{r/lx}, c_{r/ly})$ of the eye centroid 930.

Once the electronic device completes the process at block 360 of FIG. 3, the horizontal and vertical slices 804 and 806 are set with corresponding parameters determined. Next, the electronic device 101 obtains (for example, generates) a time series of horizontal eyeball motion and/or generates a time series of vertical eyeball motion according to the procedure of block 340 of FIG. 3.

Figures 11, 12:
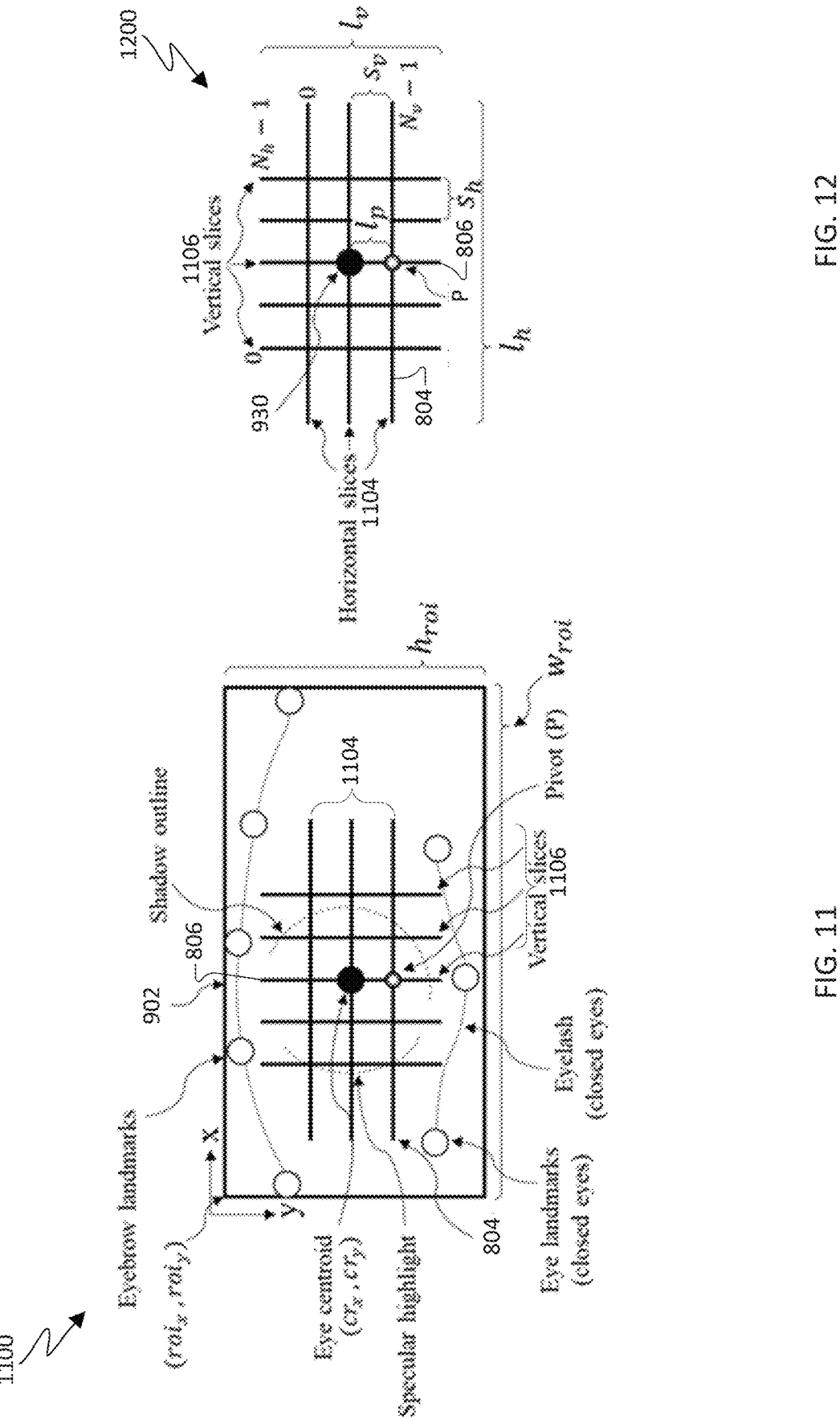
FIG. 11 illustrates features and grid parameters for shadow processing in the ROI, according to this disclosure.
FIG. 12 illustrates grid parameters, according to this disclosure.
Figures 20, 21:
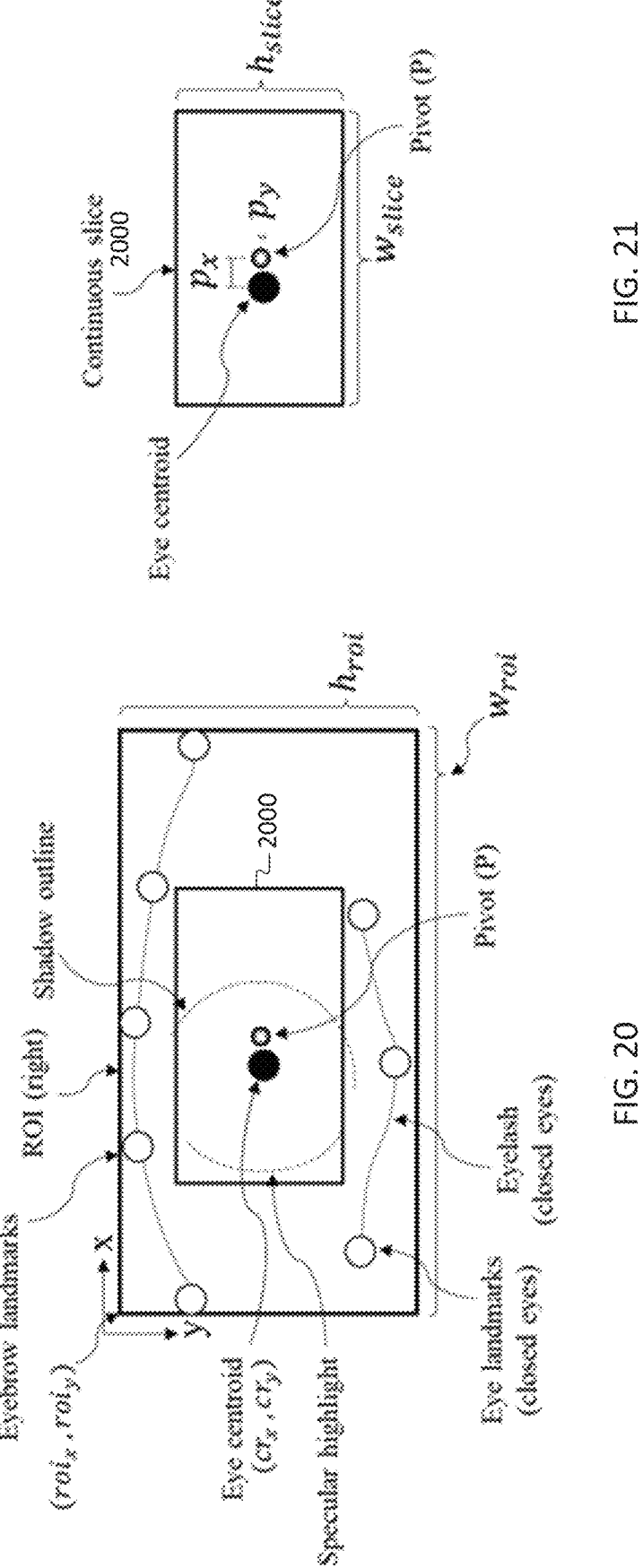
FIGS. 20 and 21 illustrate features and parameters of a continuous slice for processing shadow movement using a continuous slice in the ROI, according to this disclosure.

Although FIGS. 9 and 10 illustrate one example of features and slicing parameters for shadow processing, various changes may be made to FIGS. 9 and 10. In another embodiment of this disclosure, instead of using one slice along each of the horizontal direction and vertical direction, a grid of a plurality of horizontal slices and a plurality of vertical slices could be used to sample the shadow intensities in the eye region as shown in FIGS. 11 and 12. In another embodiment of this disclosure, instead of using one narrow-girth slice or a grid of spaced-apart slices along each of the horizontal direction and vertical direction, FIGS. 20 and 21 show a continuous set of rows and columns are selected for shadow processing the ROI.

FIG. 11 illustrates features and grid parameters for shadow processing in the ROI 1100, according to this disclosure. FIG. 12 illustrates a grid 1200 defined by the features and grid parameters for shadow processing the ROI 1100 of FIG. 11. The plurality of vertical slices 1106 and a plurality of horizontal slices 1104 in FIG. 11 are arranged as a grid 1200 illustrated in FIG. 12. The embodiment of the grid 1200 defined by the features and grid parameters of the ROI 1100 shown in FIGS. 11 and 12 are for illustration only, and other embodiments could be used without departing from the scope of this disclosure.

To avoid duplicative descriptions, the ROI 1100 is described as being the same as the ROI 900 of FIG. 9, and the right eye ROI 802 extracted from the frame 800 of FIG. 8, but also can represent other ROIs of an aligned/registered frame. The ROI 1100 includes the features 804-812 corresponding to the right eye ROI 802 of FIG. 8. More particularly, the horizontal slice 804 of FIG. 8 is referred to as a first horizontal slice 804 among the plurality of horizontal slices 1104 indexed by an index i for i=0 through i=$N_h$−1. The vertical slice 806 is referred to as a first vertical slice 806 among the plurality of vertical slices 1106 indexed by an index j for j=0 through j=$N_v$−1.

The process that the electronic device 101 uses for specifying the slice properties (e.g., features) of the pluralities of slices 1104 and 1106 is identical to the case of using a single slice (804 and 806, respectively) along each of the horizontal and vertical directions. In addition, each of the $N_h$ and $N_v$ grid parameters specifies how many slices to use along each direction, and each of the $s_h$ and $s_v$ grid parameters specifies the spacing between the plurality of horizontal slices 804 and plurality of vertical slices 806, respectively. The separation distance $l_p$ from the first horizontal slice 804 to the eye centroid 930 can be the same as or different from the spacing $s_v$ from the first horizontal slice 804 to the next horizontal slice.

As a practical advantage, the grid 1200 makes the shadow processing algorithm more robust and more invariant to noise and misregistration errors, but the time series obtained by averaging the measurements of a shadow intensity, values along the horizontal slices or along the vertical slices will exhibit a phase shift corresponding to the spacing $s_h$ and $s_v$ between the slices. Therefore, those phases of the shadow intensity values (i.e., measured along the horizontal slices or along the vertical slices) will be appropriately shifted before combining the signals.

Figure 13:
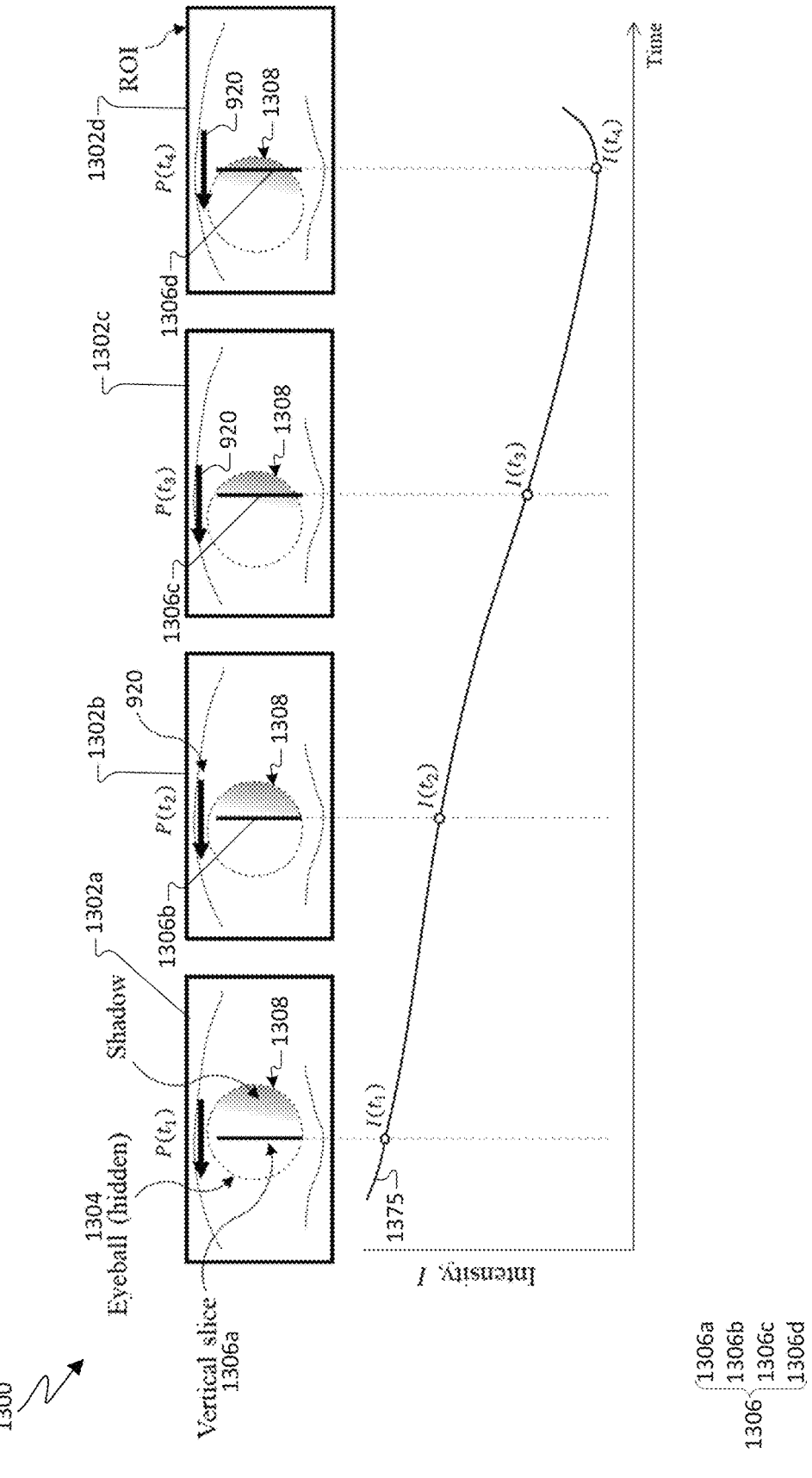
FIG. 13 illustrates a variation of shadow intensity over time in the horizontal motion time series based on a statistic of the intensity values along the vertical slice at each time instance, according to this disclosure.

FIG. 13 illustrates a variation of shadow intensity I over time in the horizontal eyeball motion time series 1300 based on a statistic (e.g., an average) of the intensity values along the vertical slice 1306 at each time instance $\{t_1, t_2, t_3 t_4\}$, according to this disclosure. The embodiment of the horizontal eyeball motion time series 1300 shown in FIG. 13 is for illustration only, and other embodiments could be used without departing from the scope of this disclosure.

The electronic device 101 obtains the time series 1300 of horizontal eyeball motion by mathematically integrating or averaging the intensity values spatially in the vertical slice 806 at each time instance among the different time instances $\{t_1, t_2, t_3 t_4\}$. Analogously, electronic device 101 can obtain another a time series of vertical eyeball motion by mathematically integrating or averaging the intensity values spatially in the horizontal slice 804 at each time instance among the different time instances $\{t_1, t_2, t_3 t_4\}$. The procedure to generate the time series 1300 of horizontal eyeball motion and the time series of vertical eyeball motion (wherein the eyeball moves up and down the vertical y-axis of the frame) is described more particularly below with FIG. 14. It is understood that a time series of vertical eyeball motion can be obtained by executing an analogous procedure, and that for simplicity, the time series 1300 of horizontal eyeball motion is described more particularly below.

The time series 1300 includes a set of ROIs 1302a-1302d, which were extracted from a corresponding set of different frames (for example, the set of frames {550, 652, 653, 654} of FIG. 6) captured at each of the different time instances $\{t_1, t_2, t_3 t_4\}$. An eyeball motion signal 1375 is generated based on plotting, as a shadow intensity I, the statistic of the measured intensity values along the vertical slice 1306 (individually 1306a-1306d) at each time instance $\{t_1, t_2, t_3 t_4\}$. The direction of change (e.g., reduction) of the amplitude of eyeball motion signal 1375 indicates that the movement of the eyeball under closed eyelids is in the second horizontal direction 920. If the movement of the user's eyeball under closed eyelids was in the first horizontal direction 910, then the amplitude of eyeball motion signal 1375 would change in an opposite direction (e.g., increase). In other words, the eyeball motion signal 1375 represents eyeball motion in any among two opposite horizontal directions 910 and 920.

In the time series 1300, the second horizontal direction 920 also shows the direction from the user's face toward the location of the light source, which is emitting light in the first horizontal direction 910. The bulge of the eyeball 1304 (hidden under closed eyelids) casts a shadow, which is illustrated as shading, and which has a shadow outline 1308. In the first ROI 1302a, the separation distance from the shadow outline 1308 to the first vertical slice 1306a represents the position of the eyeball 1304 relative to (stationary) the first vertical slice 1306, and the shadow intensity $I(t_1)$ indicates that the pixels inside the vertical slice 1306a have a high intensity, as shown by a lack of shading or high luminance. Compared to the first ROI 1302a, the fourth ROI 1302d shows that the shadow outline 1308 moved in the second horizontal direction 920 and is located (i.e., a reduced separation distance) closer the first vertical slice 1306d, which is evidence that the position of the eyeball 1304 moved in the second horizontal direction 920. Also, in the fourth ROI 1302d, the shadow intensity $I(t_4)$ indicates that the pixels inside the vertical slice 1306d have a lower shadow intensity value measurement than pixels inside other vertical slices 1306a-1306c, which is evidence that the eyeball has not moved as far in the second horizontal direction 920. Also, the lower shadow intensity values of the pixels inside the vertical slice 1306d are shown by darker shading or lower luminance, For example, the different time instances $\{t_1, t_2, t_3 t_4\}$ can include each time instance within the video 230, or can include each time instance corresponding to a set of $n_{ema}$ frames within the window length $n_{ema}$.

The calculation (i.e., spatial integration or averaging) of the statistic of the intensity values is performed to reduce the noise. This disclosure is not limited to the statistic being an average, as various embodiments can utilize a different suitable statistic. For ease of description, the statistic will be referred to as an average in this disclosure. Because the vertical slice 1306 is fixed at a particular location that is identical in the all of the ROIs 1302a-1302d of the time series 1300, the average intensity value sampled by this vertical slice 1306 will vary corresponding to the shadow movement and thus, revealing the eyeball movement (in the horizontal directions 910 and 920) hidden under the closed eyelids.

The next step in the processing pipeline is to reveal the eyeball movement signals (1D signal for each eye) by processing the shadow movements, for example, as shown by the graphical display of the eyeball motion signal 375 of FIG. 3.

Figure 14:
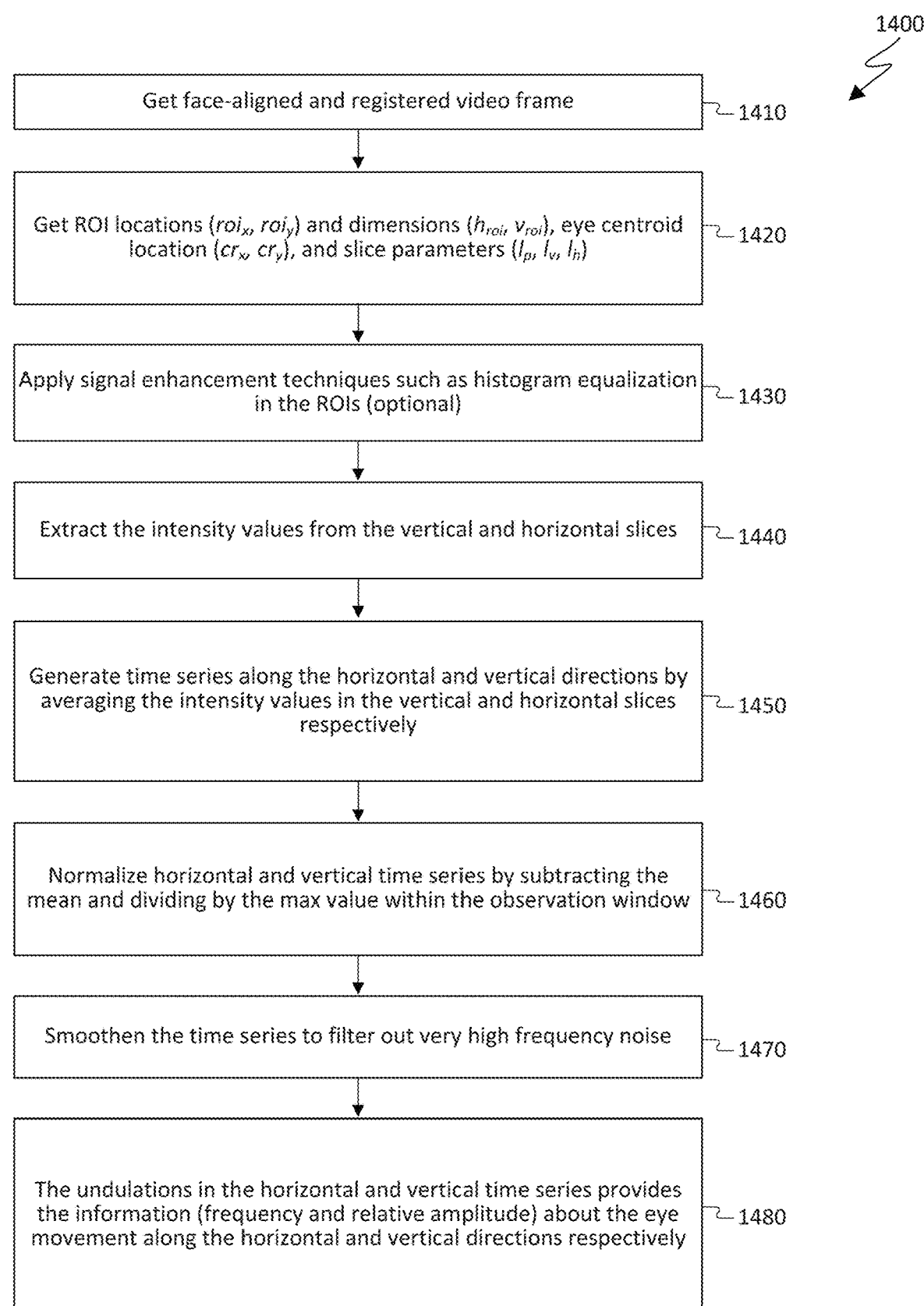
FIG. 14 illustrates a method for generating eyeball movement signals from shadow processing within the ROI, according to this disclosure.

FIG. 14 illustrates a method 1400 for generating eyeball movement signals from shadow processing within the ROI, according to this disclosure. The method 1400 is also referred to as the shadow processing method 1400, according to this disclosure. The embodiment of the method 1400 shown in FIG. 14 is for illustration only, and other embodiments could be used without departing from the scope of this disclosure. For ease of explanation, the method 1400 is described as being executed by the processor 120 of the electronic device 101.

By performing the method 1400, the electronic device 101 processes the shadow movements to reveal (e.g., detect and measure) the underlying eyeball movements hidden under the closed eyelids. At block 1410, the processor 120 obtains a frame that is face-aligned and registered with respect to a reference frame. The procedure at block 1410 can be the same as or similar to the procedure of block 330 of FIG. 3.

At block 1420, the processor 120 obtains ($roi_x$, $roi_y$) as a location of the ROI, ($h_{roi}$, $v_{roi}$) as dimensions of the ROI, ($cr_x$, $cr_y$) as the location of the right eye centroid, and ($l_p$, $l_v$, $l_h$) as slice parameters (or grid parameters). The procedures at block 1420 can be the same as or similar to the procedures of blocks 340 and 360 of FIG. 3. In the case in which the ROI represents a left eye region, the processor obtains ($cl_x$, $cl_y$) as the location of the left eye centroid. In the case in which the shadow processing method 1400 is based on the grid 1200 of FIG. 12, the processor 120 obtains ($l_p$, $l_v$, $l_h$, $N_v$, $N_h$, $s_v$, $s_h$, $g_v$, $g_h$) as grid parameters.

At block 1430, the processor 120 applies signal enhancement techniques in the ROIs. Eye movement pre-processing (e.g., block 350 of FIG. 3) can be performed to make the algorithm robust to lighting variations. For example, the electronic device 101 can apply some contrast enhancement techniques such as histogram equalization in the ROI regions (not over the whole face or whole video frame) before sampling the shadow intensity values within the slices 804 and 806. As another example, the time series (e.g., 1300 of FIG. 13) may be smoothened to remove any high-frequency signals and noise. The Savitzky Golay filter is generally a good type of filter to use for this purpose.

At block 1440, the processor 120 extracts the intensity values from the vertical slice and from the horizontal slice. For example, for a specific ROI 1302a, the processor 120 measures (e.g., using an image sensor of the camera 204) an intensity value of each pixel inside the vertical slice 1306a, calculates the statistic (e.g., average) based on those pixels inside vertical slice 1306a, and uses the calculated statistic as the shadow intensity $I(t_1)$ of the vertical slice 1306a. Analogously, in case the specific ROI 1302 is the ROI 900 of FIG. 9, then the processor 120 measures an intensity value of each pixel inside the horizontal slice 804, calculates the statistic (e.g., average) based on those pixels inside horizontal slice 804, and uses the calculated statistic as the shadow intensity $I_h(t_1)$ of the horizontal slice 804. Note that the horizontal slice 804, if applied to the specific ROI 1302 of FIG. 13, would include darker pixels along the shadow line 1308 according to the shadow of the eyeball 1304.

At block 1450, the processor 120 generates a time series 1300 along the horizontal x-axis direction by averaging intensity values in the vertical slices 1306a-1306d. Analogously, at block 1450, the processor 120 generates a time series along the vertical y-axis direction by averaging intensity values in the horizontal slice 804 of respective ROIs, for example, the same set of ROIs 1302a-1302d from which the time series 1300 is generated.

At block 1460, the processor 120 normalizes the horizontal time series 1300 and the vertical time series. In some scenarios, a respective time series may be normalized by subtracting the mean and dividing by the maximum value over an appropriate observation window.

At block 1470, the processor 120 smoothens a time series (i.e., the horizontal time series 1300 and/or the vertical time series) to filter out very high frequency noise. In an alternative embodiment, if the eyeball movements are very subtle, some other techniques that may amplify the motion in the video, such as Eulerian Video Magnification (EVM) could be applied to the ROI regions before extracting the intensity values along the vertical slice and along horizontal slice.

At block 1480, the undulations in the time series (i.e., the horizontal time series 1300 and/or the vertical time series) provide information about the nature of the eyeball movements. For example, the direction of eyeball motion at an instance of time can be obtained by analyzing the greater of the two: motions in the horizontal time series 1300 at that instance of time and motions in the vertical time series at that instance of time. The speed or how rapidly the eyeball motion is occurring within a short time period can be obtained from the frequency of the eyeball motion signal (which may be obtained by taking Fast Fourier Transforms of the (horizontal and/or vertical) time series over one or more short time windows). The amplitude of the (horizontal and/or vertical) time series provides information about how far the eyeball moves from the mean position (in a relative sense).

Figures 28, 29:
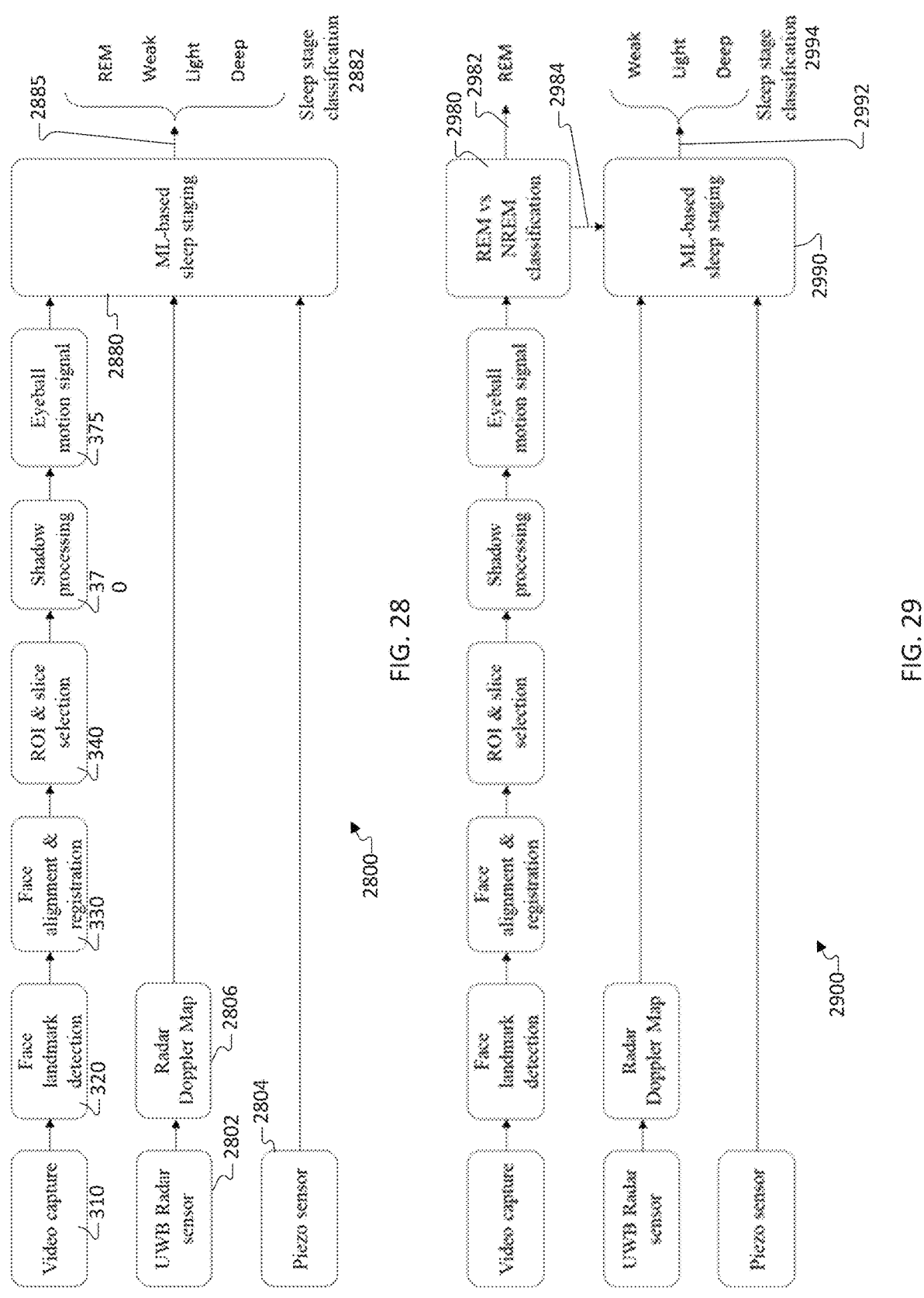
FIG. 28 illustrates a first embodiment of sleep stage classification system, according to this disclosure.
FIG. 29 illustrates a second embodiment of sleep stage classification system, according to this disclosure.

The eyeball motion signal (e.g., eyeball motion signal 375 of FIG. 3) generated as a result of execution of the shadow processing method 1400 is sent to a classifier, for example, the ML-based classifier 380 of FIG. 3, the ML-based sleep staging classifier of FIG. 28, or the sleep-stage binary classifier of FIG. 29.

Figure 15:
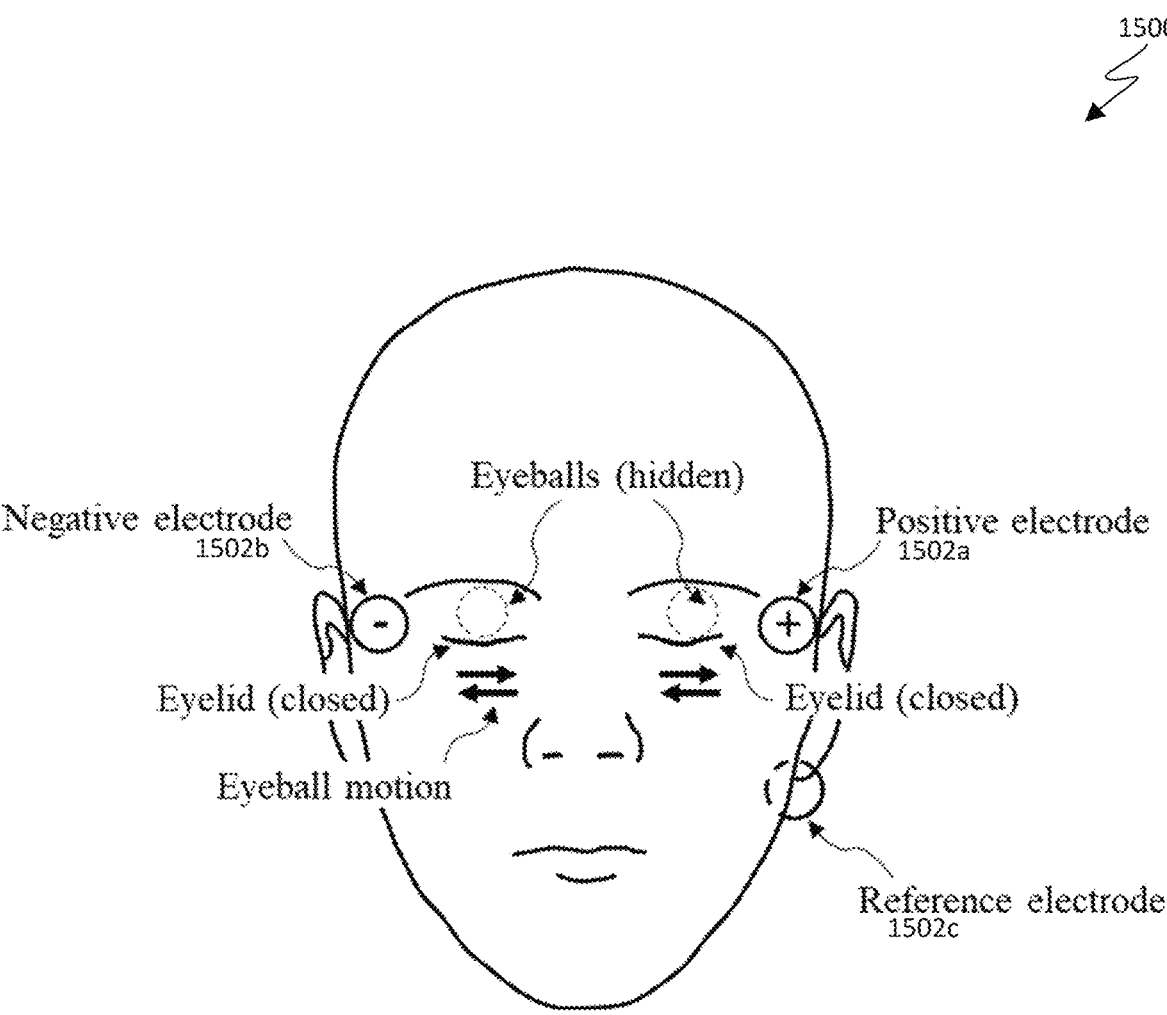
FIG. 15 illustrates an electrooculography (EOG) system of electrodes placed onto a face of a user to generate a horizontal eyeball motion signal using EOG techniques.

FIG. 15 illustrates an electrooculography (EOG) system 1500 of electrodes 1502 (e.g., EOG probes) placed onto a face of a user to generate a horizontal eyeball motion signal using EOG techniques. The EOG system 1500 performs an accurate, but invasive method for obtaining the hidden eyeball movement from EOG signals. The EOG signal is obtained by attaching EOG electrodes 1502a-1502c around the eyes. The main principle underlying the EOG signals is to measure the potential difference (voltage) between the front (positive pole formed by cornea) and back (negative pole formed by the retina) using the EEG probes. The EOG signals can be used to detect eye movements and blinks. In this configuration, the positive and negative electrodes 1502a-1502b are placed on either side of the user's eye. A reference (ground) electrode 1502c is placed on the back of the neck just under the ear. While the EOG signal in this configuration accurately reflects the horizontal eye motions, the EOG signal cannot be used to infer the vertical motions. To infer the vertical motions, another pair of positive and negative probes 1502a-1502b need to be placed above and under the eye respectively.

Figure 16:
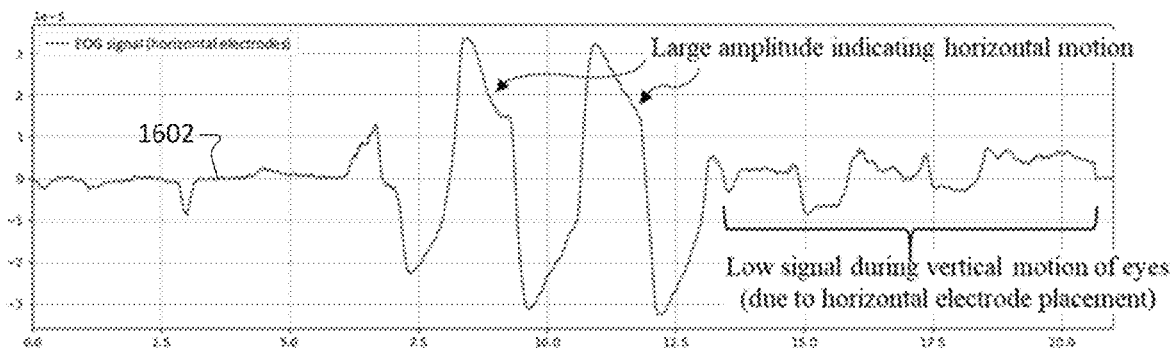
FIG. 16 illustrates closed-eye eyeball motion signals generated by the EOG system placed on the face of the user as shown in of FIG. 15.
Figure 17:
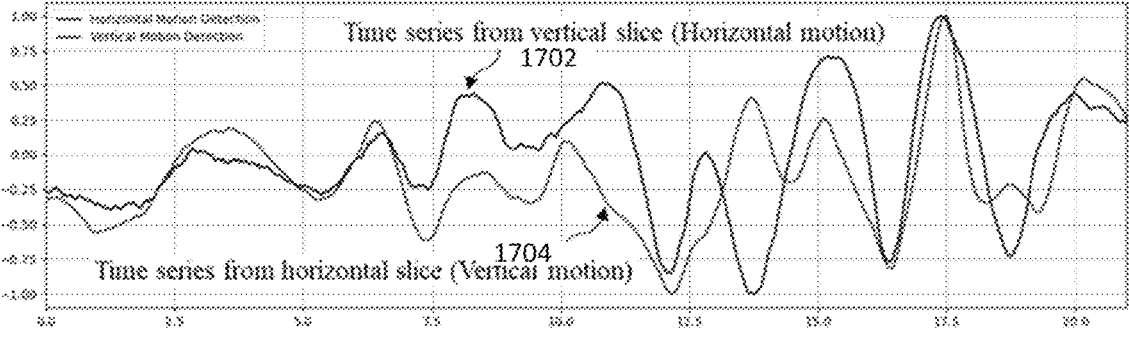
FIG. 17 illustrates closed-eye eyeball motion signals generated based on shadow movement in video frames aligned and registered using facial landmarks, according to this disclosure.
Figure 18:
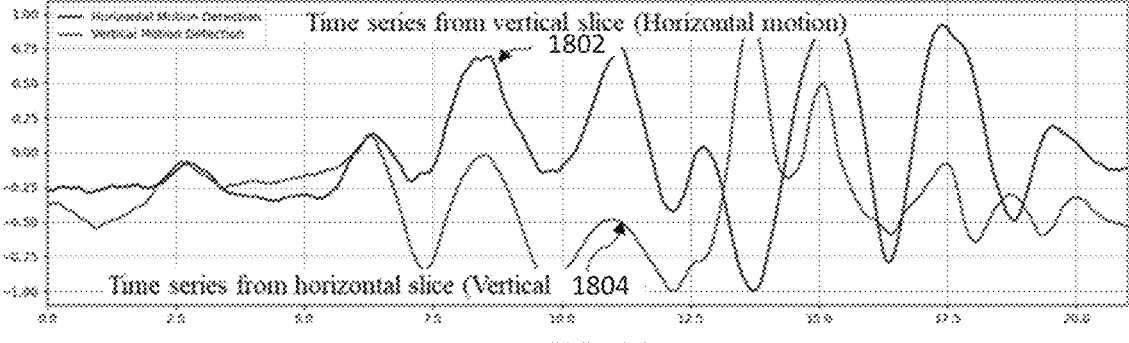
FIG. 18 illustrates closed-eye eyeball motion signals generated based on shadow movement in video frames aligned and registered using ArUco fiducial markers placed on the face of the user as shown in of FIGS. 19A and 19B, according to this disclosure.

The graphical result shown in FIGS. 16, 17, and 18 demonstrate that, using the systems and methods described in this disclosure, a user's hidden eye motion under closed eyelids (e.g., REM motion during sleep) can be non-invasively detected from video (for example, based on landmarks detected and pixel intensity values measured). FIG. 16 illustrates closed-eye EOG eyeball motion signals 1602 generated by the EOG system 1500 placed on the face of the user as shown in of FIG. 15. The EOG eyeball motion signal 1602 is obtained by placing EOG probes 1502a-1502c using the configuration shown in FIG. 15 while the user moved his eyeballs (with eyelids closed) twice along the horizontal direction followed by thrice along the vertical direction. A video of the user was obtained simultaneously to input through the method 300 (pipeline) to the derive the eyeball movement time series (e.g., similar to time series 1300) using the method 300 of FIG. 3 described herein. The obtained time series can be qualitatively compared against the horizontal motion section of the EOG eyeball motion signal 1602, which is used as a ground truth.

FIG. 17 illustrates closed-eye eyeball motion signals 1702 and 1704 generated based on shadow movement in video frames aligned and registered using facial landmarks, according to this disclosure. The horizontal eyeball motion signal 1702 derived from the horizontal time series and vertical eyeball motion signal 1704 derived from the vertical time series are obtained from shadow movement detection as described in the embodiments of this disclosure. The two strong undulations in the horizontal eyeball motion signal 1702 match well with the ground truth EOG eyeball motion signal 1602. Additionally, the vertical eyeball motion signal 1704 shows the user's eye movements thrice along the vertical direction (which are absent in the EOG signal).

Figure 19A:
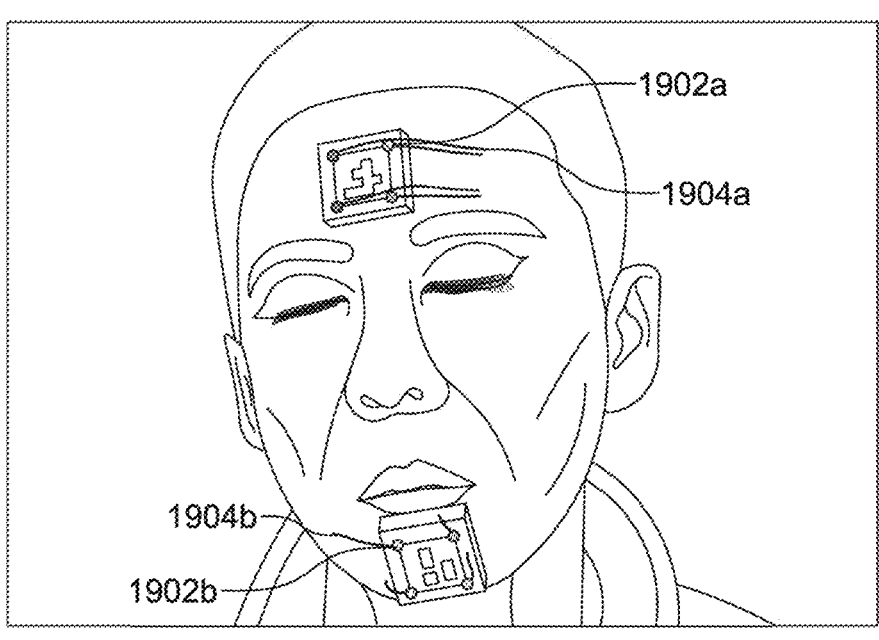
FIGS. 19A and 19B illustrate before and after facial alignment and registration of a video in which ArUco fiducial markers are placed on the face of the user.
Figure 19B:
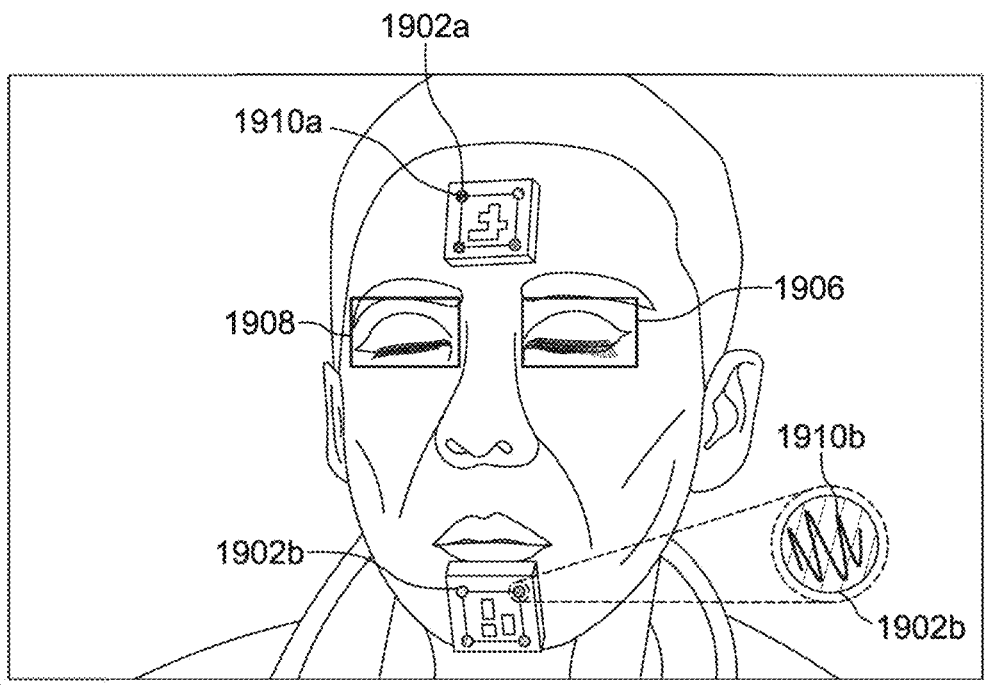

FIG. 18 illustrates closed-eye eyeball motion signals 1802 and 1804 generated based on shadow movement in video frames aligned and registered using ArUco fiducial markers 1902a-1902b placed on the face of the user as shown in of FIGS. 19A and 19B, according to this disclosure. To verify the quality of registration using facial landmarks (as shown in FIG. 17) and also to compare the eye-ball motion signal obtained from shadow movement (assuming perfect registration obtained using ArUco markers) against the ground truth eye-ball motion signals obtained from EOG, a pair of small ArUco fiducial markers were also placed on the user's face during the same video capture, as shown in FIGS. 19A and 19B. Instead of registering the video frames using facial landmarks, the video frames were registered using the corner points detected on the fiducial markers 1902a-1902b, which provides more accurate registration compared to facial landmark-based registration. The corresponding horizontal and vertical eyeball motion signals 1802 and 1804 generated based on the ArUco time series are shown in FIG. 18. As expected, the ArUco-based eyeball motion signals 1802 and 1804 in FIG. 18 are smoother compared to FIG. 17, but these graphs demonstrate there is a good match between the corresponding signals in FIG. 17 and FIG. 18.

FIGS. 19A and 19B illustrate before and after facial alignment and registration of a video in which ArUco fiducial markers are placed on the face of the user. FIG. 19A shows the tracked paths 1904a-1904b of motion of the fiducial markers 1902a-1902b before facial alignment and registration of the video. An ArUco fiducial marker (such as 1902a) can include multiple points for image registration. For example, four points for registration are shown at vertices for each of the ArUco fiducial markers 1902a-1902b. Motion of a point for registration represents motion of the fiducial marker on which the registration point is located. FIG. 19B shows the left and right ROIs 1906 and 1908 extracted and the tracked paths 1910a-1910b of motion of the registration points. The tracked paths 1910a-1910b do not extend beyond a few pixels spatially, which supports an assumption that the video in FIG. 19B is registered substantially perfectly. In some implementations, the video in FIG. 19B can be perfectly registered if the tracked paths remain stationary at the location of the registration points, respectively.

FIGS. 20 and 21 illustrate features and parameters of a continuous slice for processing shadow movement using a continuous slice in the ROI, according to this disclosure. The embodiment of the features and parameters of a continuous slice shown in FIGS. 20 and 21 are for illustration only, and other embodiments could be used without departing from the scope of this disclosure.

As another method for processing the shadow movements to reveal the underlying eyeball motion, a continuous set of rows and columns are selected. In other words, this embodiment does not employ separate slices along the horizontal and vertical directions, but rather a single continuous slice 2000 is used. This continuous slice 2000 is a block or region of pixels located within the ROI. Like the alternative embodiment that includes the grid 1200, this continuous slice 2000 embodiment is also designed to improve the signal-to-noise ratio (SNR) of the shadow movement signal. Each row (or column) in this continuous slice 2000 has similar shadow variations (related to the underlying eyeball motion) captured. Therefore, an appropriate signal processing method can be employed to combine these motions. Although the rows (or columns) may simply be summed together to reduce the noise, a better approach could be to use principal component analysis (PCA) to compute the eyeball motion signal out of the noise.

FIGS. 22-25 are used to describe an embodiment of this disclosure in which the signal spread is defined as the difference between the maximum value and the minimum value of the signal within the observation window. Alternatively, the spread could be defined as the standard deviation of the amplitude of the signal within the observation window. FIGS. 22-25 illustrate an example case of an embodiment of this disclosure that uses a single slice along each direction (only the vertical slice is illustrated in the figure for simplicity).

Figure 22:
FIG. 22 illustrates a time series of pixel intensity at each pixel along the vertical slice spanning the entire height of the ROI shown in FIG. 23, according to this disclosure.
Figure 23:
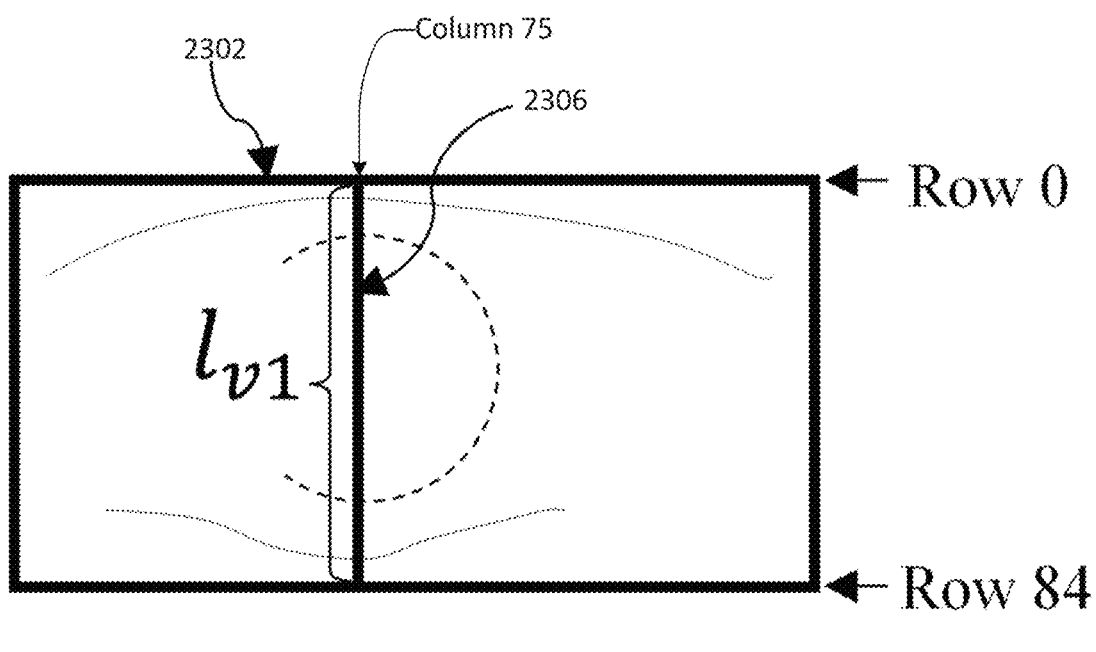
FIG. 23 illustrates vertical slice spanning the entire height of the ROI, according to this disclosure.

FIG. 22 illustrates a time series 2200 of pixel intensity (inverted) at each pixel along the vertical slice spanning the entire height of the ROI shown in FIG. 23, according to this disclosure. The mean time series 2202, which is the average of all the time series is also shown in FIG. 22. FIG. 23 illustrates a vertical slice 2306 that has a dimension of $l_{v1} \times 1$ pixels spanning the entire height of the ROI 2302, according to this disclosure. For example, the entire height ($l_{v1}$) can span from row 0 of the ROI 2302 to row 84, and the vertical slice 2306 can be located in column 75 of the ROI 2302.

In this embodiment, the location of the pivot-point (P) of the slices for sampling the shadow with respect to the eye centroids in each eye region of interest (ROI) is adaptive. In this embodiment, $l_p$ can vary or $p_x$ and $p_y$ can vary. In addition, the dimensions of the slices: $l_v$ and $l_h$, or $h_{slice}$ and $w_{slice}$, and the number of slices and spacing between the slices: $N_h$, $N_v$, $s_v$, and $s_h$ can vary. These parameters in this embodiment vary in response to the signal (time series) strength over the noise floor estimated at each pixel in the one or more slices. The signal strength may be measured by the spread of the un-normalized time series within an observation window. The spread of the signal may be defined in several ways.

Figure 25:
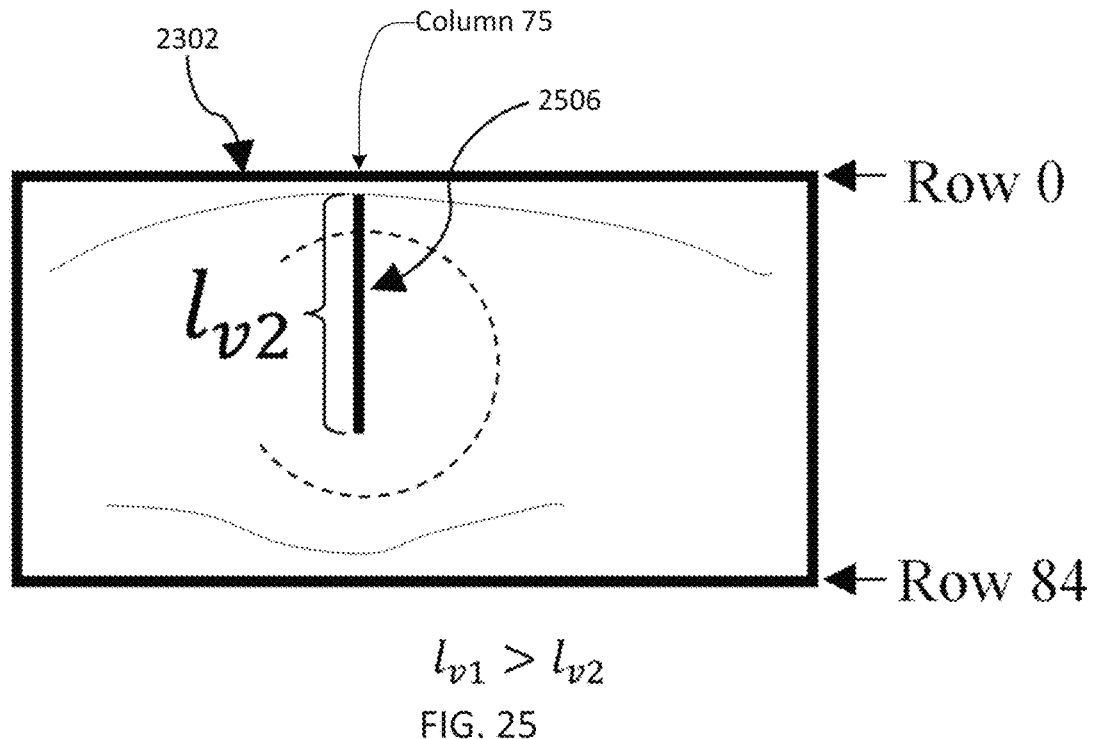
FIG. 25 illustrates a vertical slice spanning a partial height of the ROI between a specified subset of rows, according to this disclosure.
Figure 24:
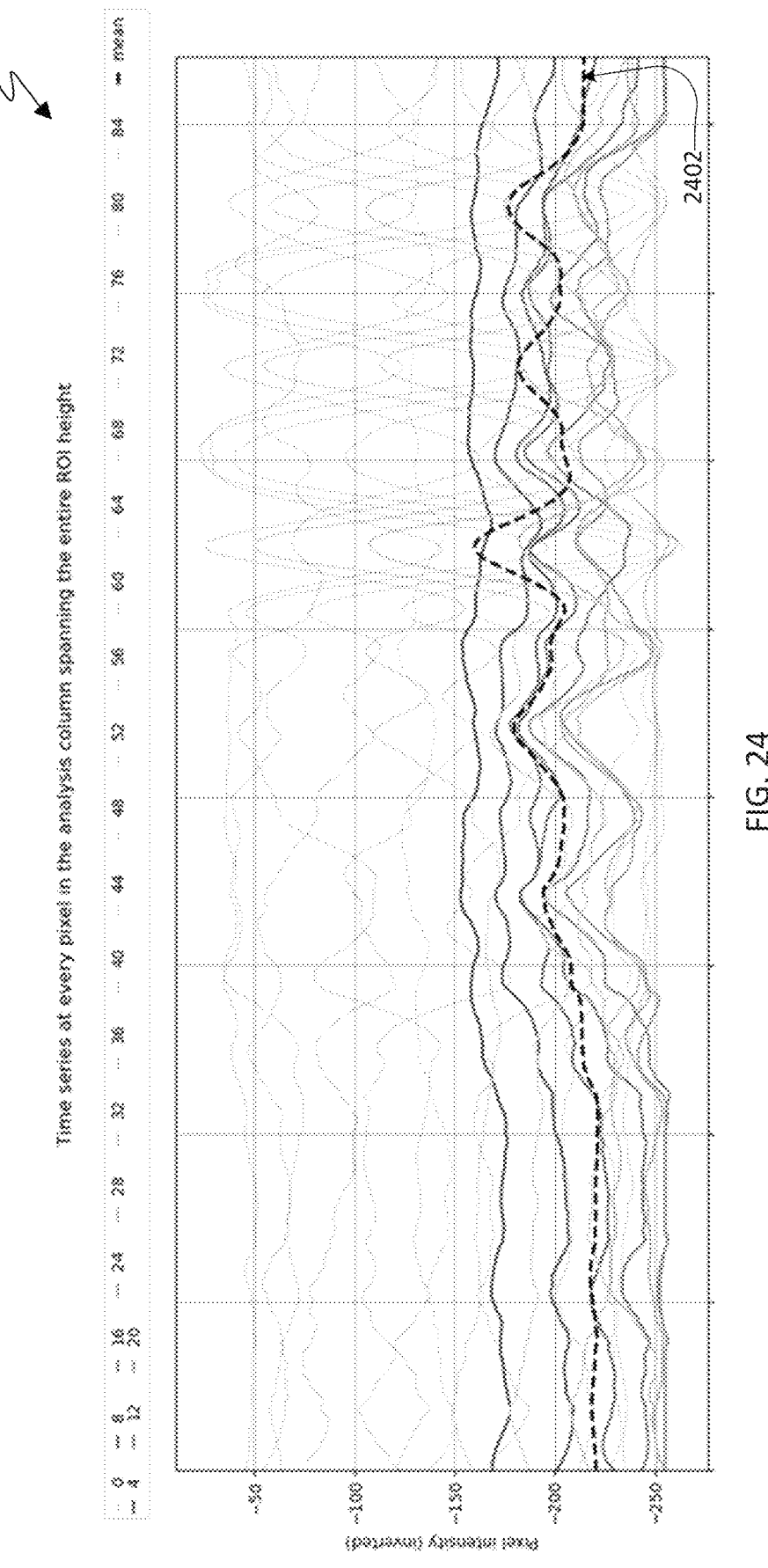
FIG. 24 illustrates a time series of pixel intensity at each pixel in the same column that is collocated with the vertical slice in FIG. 23 and a mean signal, according to this disclosure.

FIG. 24 illustrates a time series 2400 of pixel intensity (inverted) at each pixel in the same column (for example, column 75) that is collocated with the vertical slice in FIG. 23, and a mean signal 2402 that is an average of the pixel values in the vertical slice 2506 having dimension $l_{v2} \times 1$ pixels as shown in FIG. 25, according to this disclosure. FIG. 25 illustrates a vertical slice 2506 having dimension of $l_{v2} \times 1$ pixels spanning a partial height of the ROI 2302 between rows 8 and 44, according to this disclosure. FIG. 25 shows a comparison ($l_{v1} > l_{v2}$) to FIG. 23, namely that the entire height ($l_{v1}$) of the ROI 2302 is greater than the partial height ($l_{v2}$) of the same ROI.

FIG. 24 shows the time series obtained at each pixel in the same column that is collocated with the vertical slice in FIG. 23, but the mean signal is obtained by averaging the pixel values in the vertical slice with dimension ($l_{v2} \times 1$ pixels) as shown in FIG. 25. The vertical slice in FIG. 25 spans between rows 8 and 44. FIGS. 22 and 24 demonstrate that: (1) the signal strength of the time series obtained at the pixels corresponding to different rows along the whole vertical column is not uniform. The signal strength of the mean time series 2402 obtained by averaging only the high signal strength time series as shown in FIG. 24 is greater than the signal strength of the mean signal 2202 obtained by averaging all the time series along the column (shown in FIG. 22). This example demonstrates that the signal strength of the averaged time series, which reveals the hidden eyeball motion characteristics, may be optimized by adaptively selecting the dimensions and position of the slices.

Figures 26, 27:
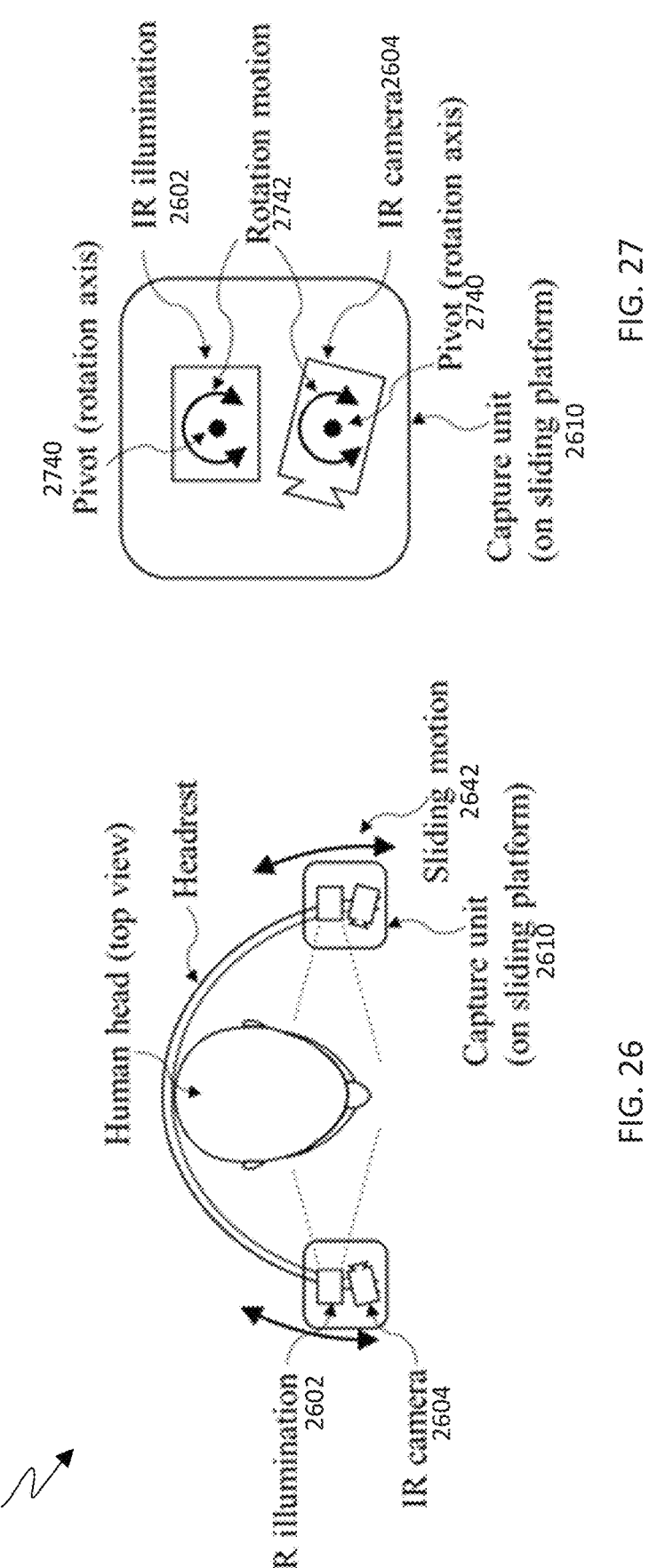
FIG. 26 illustrates a system of reconfigurable hardware to optimize an angle and placement of cameras and light sources to improve shadow intensity signal strength, according to this disclosure.
FIG. 27 illustrates a close-up view of a capture unit within the system of FIG. 27.

FIG. 26 illustrates a system 2600 of reconfigurable hardware to optimize an angle and placement of cameras and light sources to improve shadow intensity signal strength, according to this disclosure. FIG. 27 a close-up view of a capture unit within the system of FIG. 26. The embodiment of the system 2600 shown in FIGS. 26 and 27 is for illustration only, and other embodiments could be used without departing from the scope of this disclosure.

The system 2600 is similar to and includes components 202, 204, 206, and 208 from the system 200 of FIG. 2. More particularly, the light source 202 and camera 204 within the system 2600 include an IR light source 2602 and an IR camera 2604, respectively. The capture unit 2610 shown in FIGS. 26 and 27 is similar to the capture device 210 of FIG. 2 and includes additional components such as one or more rotatable mounts and one or more motorized mounts at the pivots 2740, as described more particularly below.

The hardware in the system 2600 is reconfigurable to optimize the position and orientation of the camera and light source with respect to the user's face to improve the signal strength of the time series signals. While sleeping or resting, the user may move and reorient her head from time to time. If the change is too large, the user's eye (whether one or both) may be turned away completely from the camera 2604. In such cases, the position and orientation of the camera 2604 and light source 2602 can be changed (by the user in manual-reconfigurable embodiments or by the processor 120 controlling motors automatically) to optimize the generation and visibility of the shadows in the eye region. The position and orientation of the cameras 2604 and light sources 2602 are not fixed, but do remain stationary during operation of the methods (e.g., 300 and 3000) for detecting eyeball motion under closed eyelids. The cameras 2604 and light sources 2602 may be placed on motorized mounts that enable the position and orientation to be reconfigured (e.g., adjusted) electromechanically during operation. Furthermore, the cameras 2604 and light sources 2602 may be mounted on rotatable mounts that enable the orientations to be changed (e.g., rotated electromechanically by motors) during operation.

Referring to FIG. 27, the capture unit 2610 includes pivots 2740 about which the IR light source 2602 and IR camera 2604 rotate in directions 2742 of rotation motion, respectively. Each of the pivots 2740 can include a rotatable mount that attaches to the corresponding light source 2602 or the camera 2604, respectively.

The capture unit 2610 includes one or more motorized mounts, for example, located at the pivots 2740. The light source 2602 and the camera 2604 attach to a motorized mount, which slides in a direction 2642 of sliding motion along the sliding platform 208 of the headrest 206. The end of the sliding platform 208 enables the motorized motor mount to slide from one end of the sliding platform 208 toward the vertex of the U-shape. Movement of the motorized motor mount can be similar to movement along a track of a track lighting fixture.

In some embodiments, the system 2600 further includes the electronic device that includes a processor, such as the electronic device 101 that includes the processor 120 of FIG. 1. To adjust (e.g., increase) strength of an eyeball motion signal, the processor 120 controls (e.g., drives) one or more motors associated with the motorized mounts and rotatable mounts to: slide the motorized mount to adjust the position of the light source 2602 or adjust the position of the camera 2604, with respect to the face of the user; and rotate the rotatable mounts to adjust an orientation of the light source 202 and the camera 204, respectively.

FIG. 28 illustrates a first embodiment of sleep stage classification system 2800, according to this disclosure. The embodiment of the system 2800 shown in FIG. 28 is for illustration only, and other embodiments could be used without departing from the scope of this disclosure. The system 2800 includes the system 200 of FIG. 2, and is able to execute the method 300 of FIG. 3 (including its components 310, 320, 330, 340, 370, 375).

The sleep stage classification system 2800 is employed in a smart sleep chair or a smart sleep bed to improve the quality of sleep or rest of the user. The system 2800 is used in smart chairs or beds to detect the sleep stage of the user so that the smart chair or bed can do (or not do) specific functions to improve the quality or prolong a particular sleep stage to maximize comfort or rest. Sleep stage detection is an important component of such applications and products that may be used in both personal care and healthcare industries.

The system 2800 includes an ML-based sleep staging classifier 2880, which is an example of the ML-based classifier 380. The ML-based sleep staging classifier 2880 receives input signals such as the user's eyeball motion signal 375, a Radar Doppler Map 2806 that contains information about the vital signs (e.g., respiration and heart rate) of the user, and body movement signals from a piezo sensor 2804. For example, the ML-based sleep staging classifier 2880 receives as input and classifies the eyeball motion signal 375 into one sleep stage selected from among a set 2882 of sleep stage classes, including the REM, Weak non-REM, Light non-REM, and Deep non-REM class. The ML-based sleep staging classifier 2880 outputs the sleep stage classification 2885 to affect functionality of the smart chair/bed. In some embodiments, the classification 2885 output includes a likelihood value for each of the four sleep stage class within the set 2882.

The system 2800 includes an ultra-wideband (UWB) radar sensor 2802, which can be incorporated within the capture device 210. The system 2800 further includes a piezo sensor 2804, which can be incorporated into the headrest 206. The UWB radar sensor 2802 and piezo sensor 2804 could be incorporated into a smart sleep chair/bed in some embodiments. The piezo sensor 2804 can also provide vital signal information in addition to body movements. Also, mmWave Radar sensing could also be used in addition to or instead of the UWB Radar sensor 2802 for sensing vital signs. Since 2D spectrograms obtained from the different signals are used as input features, the ML-based sleep staging classifier 2880 includes a convolutional neural network (CNN) architecture. The eyeball motion signal 375 is obtained by processing the shadows near the eye region as described in this disclosure. Based on these inputs, the ML-based sleep staging classifier 2880 can very accurately predict the current sleep stage of the user as Rapid Eye Movement (REM), Deep, Light, or Weak. In this application, the use of eyeball motion signal is extremely important for the accurate prediction of REM vs non-REM sleep stages.

FIG. 29 illustrates a second embodiment of sleep stage classification system 2900, according to this disclosure. The embodiment of the system 2900 shown in FIG. 29 is for illustration only, and other embodiments could be used without departing from the scope of this disclosure. The system 2900 is similar to the system 2800 of FIG. 28, except the ML-based sleep staging classifier 2880 of FIG. 28 is replaced by two classifiers 2980 and 2990, together which are an example of the ML-based classifier 380.

In this architecture of the system 2900, the sleep stage at any instant of time is first distinguished between REM sleep or non-REM sleep based on the eyeball motion signals 375 revealed from the movement of shadows near the eye region. Because the method of classification between REM versus non-REM based on eyeball motion signal is not very complex, a low-complexity simple classifier 2980 can be a rule-based (heuristic) classifier or can be a simple ML-based classifier. This simple classifier 2980 uses features that include short-time Fourier transform (STFT) or the instantaneous frequency and amplitude of the eyeball motion signal 375. The simple classifier 2980 outputs a first indicator 2982 that the user is in the REM sleep state, in response to a determination that the user is in the REM sleep state. In response to a determination that the user is not in the REM sleep state, the simple classifier 2980 sends a second indicator 2984 that the user is in a non-REM sleep state to a second ML-based sleep stage classifier 2990.

The second ML-based sleep stage classifier 2990 continually generates and outputs the likelihood probabilities 2992 of the other sleep stages 2994 (Weak, Light, or Deep). The probabilities 2992 output are ignored during the time that the output from the first-stage simple classifier 2980 is the first indicator 2982 of the REM sleep stage. When the first-stage simple classifier 2980 outputs the second indicator 2984 of a non-REM sleep stage, then the particular class of non-REM sleep is established from the probabilities 2992 output from the second-stage ML-based sleep stage classifier 2990. Similar to the architecture of the ML-based sleep staging classifier 2880 of FIG. 28, the ML-based sleep stage classifier 2990 in FIG. 29 could be a CNN type of architecture with the last few layers being fully connected.

Figure 30A:
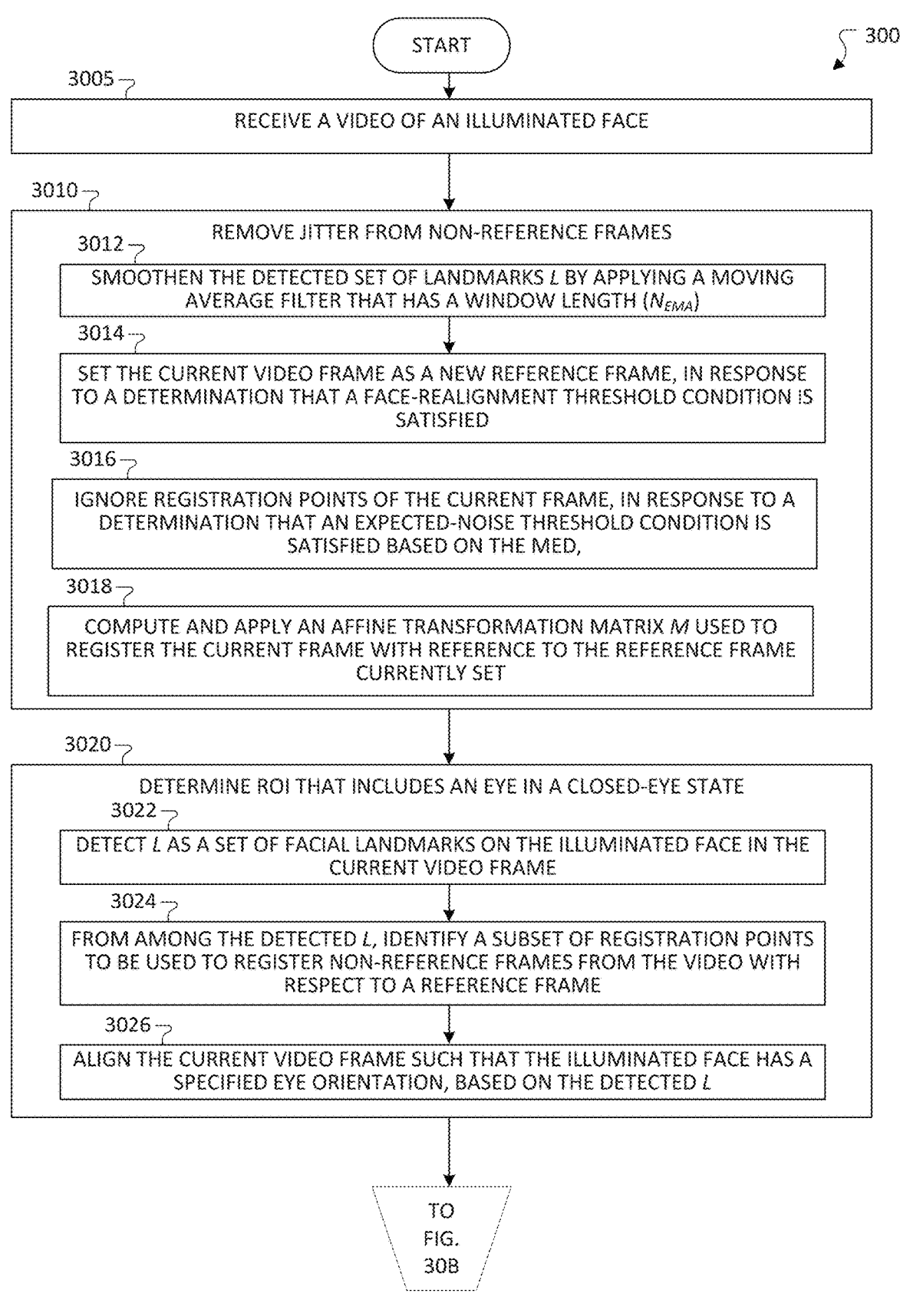
FIGS. 30A and 30B illustrate a method for eyeball movement detection in closed eye based on video in accordance with an embodiment of this disclosure.
Figure 30B:
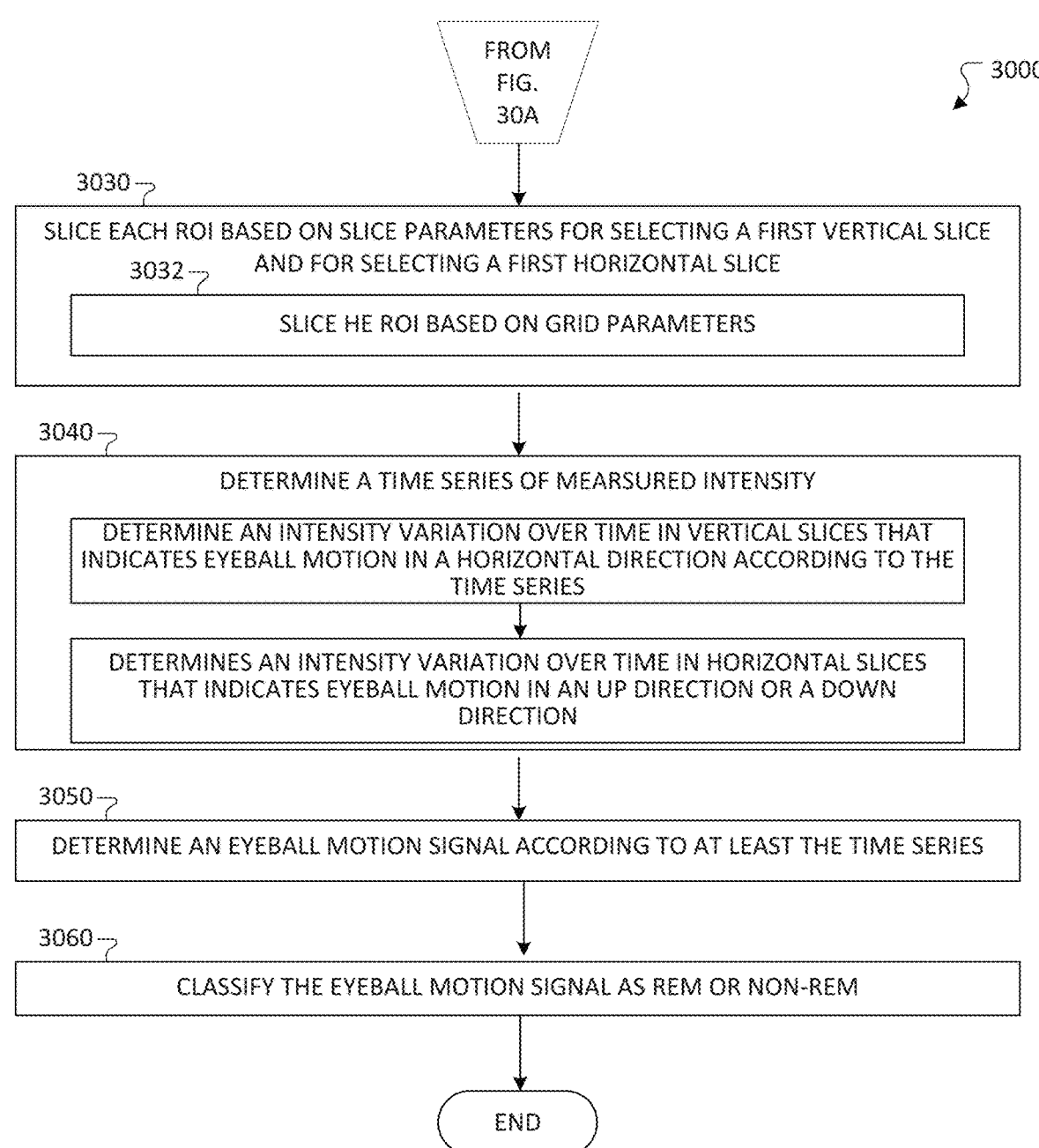

FIGS. 30A and 30B illustrate a method 3000 for eyeball movement detection in closed eye based on video in accordance with an embodiment of this disclosure. The embodiment of the method 3000 shown in FIGS. 30A and 30B is for illustration only, and other embodiments could be used without departing from the scope of this disclosure.

The method 3000 is implemented by a system, such as the system 200 of FIG. 2. More particularly, the method 3000 could be performed by a processor 120 of the electronic device 101 executing the application 147. For ease of explanation, the method 3000 is described as being performed by the processor 120 utilizing other components within the system 200 of FIG. 2.

At block 3005, the processor 120 receives a video 230 of an illuminated face. A light source illuminates the face of a user. A camera captures the video of the illuminated face. The video frames (e.g., original frames 301-303 and so forth) in the video 230 are associated with different time instants $\{t_1, t_2, t_3\ t_4\}$ of a time series (e.g., 1300 of FIG. 13), respectively. More particularly, video 230 is received including a current video frame of the illuminated face from the video.

At block 3010, in response to a determination that the current video frame is not the reference frame, the processor 120 removes jitter from the registered video frame. The three-pronged jitter removal process is described with FIGS. 4B and 4C. At block 3012, to remove jitter, the processor 120 smoothens the detected L by applying a moving average filter that has a window length ($n_{ema}$) to remove noise in the detected L. At block 3014, the processor 120 sets the current video frame as a new reference frame, in response to a determination that a face-realignment threshold condition is satisfied based on a mean Euclidean distance (MED) from the subset of registration points of the current video frame to the subset of registration points of a previous video frame, respectively.

At block 3016, to remove jitter, the processor 120, in response to a determination that the face-realignment threshold condition is not satisfied and a determination that an expected-noise threshold condition is satisfied based on the MED, the processor 120 computes an affine transformation matrix (M). The affine transformation matrix (M) is computed such that a multiplication product of the M by the subset of registration points of a previous video frame is equivalent to the subset of registration points of the reference frame currently set, thereby ignoring the registration points of the current frame.

At block 3018, in response to a determination that the face-realignment threshold condition and the expected-noise threshold condition are not satisfied based on the MED, the processor 120 computes the affine transformation matrix M such that a multiplication product of the M by the subset of registration points of the current video frame is equivalent to the subset of registration points of the reference frame currently set. That is, the processor 120 computes the affine transformation matrix M to be used to register the current frame with reference to the reference frame currently set.

Also at block 3018, the processor 120 applies the M to the current video frame, thereby completing jitter-free the registration of the current video frame after the M is applied with respect to the reference frame currently set.

At block 3020, the processor 120 determines a region of interest (ROI) that includes an eye in a closed-eye state on the illuminated face based on at least one frame in a plurality of video frames in the video. As shown at block 3022, in order to determine the ROI, the processor 120 first detects a set (L) of facial landmarks on the illuminated face in the current video frame. The detected L includes a first eye lash landmark and at least one of: a second eye lash landmark, eyebrow landmarks, or nose landmarks. At block 3024, from among the detected L, the processor 120 identifies a subset of registration points to be used to register non-reference frames from the video with respect to a reference frame.

As shown at block 3026, in order to determine the ROI, the processor 120, in response to a determination that the current video frame is the reference frame, aligns the current video frame such that the illuminated face has a specified eye orientation, based on the detected L. Further, in response to a determination that the current video frame is not the reference frame, the processor 120 registers (via image registration) the current video frame with respect to the reference frame using the subset of registration points. For example, as shown in FIG. 3, the illuminated face 390" has the specified eye orientation in the current video Frame 2 312 after the registration.

Refer to FIG. 30B. At block 3030, the processor 120 slices each ROI based on slice parameters $l_p$, $l_v$, $l_h$ for selecting a first vertical slice 806 that includes a first eye centroid 930 of the eye in the closed-eye state, and for selecting a first horizontal slice 804 that intersects the first vertical slice 806 at a pivot (P) located $l_p$ pixels from the first eye centroid.

At block 3040, in order to determine the eyeball motion signal, the processor 120 determines a time series 1300 of a statistic of measured intensity I. More particularly, the processor 120 determines an intensity variation (for example, the set $\{I(t_1) \ldots I(t_4)\}$) over time in vertical slices that indicates eyeball motion in a horizontal direction 910 or 920 according to the time series 1300, based on a statistic (e.g., average) of intensity values (e.g., pixel intensity) of the shadow measured spatially within the first vertical slice 806, 1306 at each of the different time instants. Further, the processor 120 determines an intensity variation over time in horizontal slice 804 that indicates eyeball motion in an up direction or a down direction (e.g., y-axis) according to the time series 1300, based on the statistic of intensity values I of the shadow measured spatially within the first horizontal slice 804 at each of the different time instants.

At block 3050, the processor 120 determines an eyeball motion signal 375, 1375 according to at least the time series 1300. The processor 120 determines (e.g., plots) the eyeball motion signal 375, 1375 based on a measured value of a shadow intensity I of the eye within at least one of the first vertical slice 806, 1306 or the first horizontal slice 804 at each of the different time instants. As shown in FIG. 13, a reduction and an increase of the intensity values I between the different time instants indicates the eyeball motion in a first and a second horizontal direction from among two opposite horizontal x-axis directions 910 and 920, respectively. Analogously, a reduction and an increase of the intensity values between the different time instants indicates the eyeball motion in a first and a second vertical direction from among two opposite vertical y-axis directions, respectively.

At block 3060, the processor 120 classifies the eyeball motion signal according to a set 2882 of sleep classes. More particularly, the processor 120, determines whether a user is in a rapid eye movement (REM) sleep state, based on a machine learning based (ML-based) sleep state classifier that processes the eyeball motion signal corresponding to the illuminated face of the user. As the sleep stage classification output from the system (e.g., system executing the method 300; system 2800 or 2900), the processor 120 outputs a first indicator 2982 that the user is in the REM sleep state, in response to a determination that the user is in the REM sleep state.

In response to a determination that the user is not in the REM sleep state, the processor sends a second indicator that the user is in a non-REM sleep state to a second ML-based sleep state classifier. Further, the processor 120 classifies the non-REM sleep state as one non-REM class from among multiple non-REM classes, via the second ML-based sleep state classifier 2990. The second ML-based sleep state classifier 2990 processes the second indicator and at least one of: vital sign information of the user sensed by a radar sensor; piezo sensor signals indicating body movement of the user. The processor 120 outputs a third indicator (e.g., probabilities 2992) that indicates the one non-REM class.

Although FIGS. 30A and 30B illustrate an example method 3000 for eyeball movement detection in closed eye based on video, various changes may be made to FIGS. 30A and 30B. For example, while shown as a series of steps, various steps in FIGS. 30A and 30B could overlap, occur in parallel, occur in a different order, or occur any number of times. As a particular example, in some embodiments of block 3030 is modified such that the processor 120 (at block 3032) slices the ROI based on grid parameters ($l_p$, $l_v$, $l_h$, $N_v$, $N_h$, $s_v$, $s_h$, $g_v$, $g_h$) for selecting a plurality of vertical slices that includes the first vertical slice, and selecting a plurality of horizontal slices that includes the first horizontal slice. The processor 120 slices each ROI. The processor 120 determines an intensity variation over time in the plurality of vertical slices that indicates eyeball motion in a horizontal direction according to the time series, based on a first phase shift corresponding to a spacing ($s_v$) between the plurality of vertical slices and an average of intensity values of the shadow measured spatially within each among the plurality of vertical slices at each of the different time instants. The processor 120 determines an intensity variation over time in the plurality of horizontal slices that indicates eyeball motion in a vertical direction according to the time series, based on a second phase shift corresponding to a spacing ($s_h$) between the plurality of horizontal slices and an average of intensity values of the shadow measured spatially within each among the plurality of horizontal slices at each of the different time instants.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   receiving, by a processor, a video of an illuminated face, video frames in the video associated with different time instants of a time series, respectively;
   determining a region of interest (ROI) that includes an eye in a closed-eye state on the illuminated face based on at least one frame in a plurality of video frames in the video;
   slicing each ROI based on slice parameters for selecting a first vertical slice that includes a first eye centroid of the eye in the closed-eye state, and for selecting a first horizontal slice that intersects the first vertical slice at a pivot (P) located $l_p$ pixels from the first eye centroid; and
   determining an eyeball motion signal according to at least the time series, based on a measured value of a shadow intensity of the eye within at least one of the first vertical slice or the first horizontal slice at each of the different time instants.

2. The method of claim 1, wherein:
   determining the eyeball motion signal further comprises determining an intensity variation over time in vertical slices that indicates eyeball motion in a horizontal direction according to the time series, based on a statistic of intensity values of the shadow measured spatially within the first vertical slice at each of the different time instants; and
   a reduction and an increase of the intensity values between the different time instants indicates the eyeball motion in first and second from among two opposite horizontal directions, respectively.

3. The method of claim 1, wherein:
   determining the eyeball motion signal further comprising determining an intensity variation over time in horizontal slices that indicates eyeball motion in an up direction or a down direction according to the time series, based on a statistic of intensity values of the shadow measured spatially within the first horizontal slice at each of the different time instants; and
   a reduction and an increase of the intensity values between the different time instants indicates the eyeball motion in a first and a second from among two opposite vertical directions, respectively.

4. The method of claim 1, further comprising:
   slicing the ROI based on grid parameters for selecting a plurality of vertical slices that includes the first vertical slice, and selecting a plurality of horizontal slices that includes the first horizontal slice;
   determining an intensity variation over time in the plurality of vertical slices that indicates eyeball motion in a horizontal direction according to the time series, based on a first phase shift corresponding to a spacing ($s_v$) between the plurality of vertical slices and an average of intensity values of the shadow measured spatially within each among the plurality of vertical slices at each of the different time instants; and determining an intensity variation over time in the plurality of horizontal slices that indicates eyeball motion in a vertical direction according to the time series, based on a second phase shift corresponding to a spacing $(s_h)$ between the plurality of horizontal slices and an average of intensity values of the shadow measured spatially within each among the plurality of horizontal slices at each of the different time instants.

5. The method of claim 1, wherein:

receiving the video further comprises receiving a current video frame of the illuminated face from the video; and the method further comprises:

detecting a set (L) of facial landmarks on the illuminated face in the current video frame, the detected L including a first eye lash landmark and at least one of: a second eye lash landmark, eyebrow landmarks, or nose landmarks;

from among the detected L, identifying a subset of registration points to be used to register non-reference frames from the video with respect to a reference frame;

in response to a determination that the current video frame is the reference frame, aligning the current video frame such that the illuminated face has a specified eye orientation, based on the detected L;

in response to a determination that the current video frame is not the reference frame:

registering the current video frame with respect to the reference frame using the subset of registration points, wherein the illuminated face has the specified eye orientation in the current video frame after the registration; and removing jitter from the registered video frame.

6. The method of claim 5, wherein removing the jitter comprises:

smoothening the detected L by applying a moving average filter that has a window length $(n_{ema})$ to remove noise in the detected L; and setting the current video frame as a new reference frame, in response to a determination that a face-realignment threshold condition is satisfied based on a mean Euclidean distance (MED) from the subset of registration points of the current video frame to the subset of registration points of a previous video frame, respectively.

7. The method of claim 5, wherein removing the jitter further comprises:

in response to a determination that a face-realignment threshold condition is not satisfied and a determination that an expected-noise threshold condition is satisfied based on a mean Euclidean distance (MED) from the subset of registration points of the current video frame to the subset of registration points of a previous video frame, respectively, compute an affine transformation matrix (M) such that a multiplication product of the M by the subset of registration points of a previous video frame is equivalent to the subset of registration points of the reference frame currently set;

in response to a determination that the face-realignment threshold condition and the expected-noise threshold condition are not satisfied based on the MED, compute the M such that a multiplication product of the M by the subset of registration points of the current video frame is equivalent to the subset of registration points of the reference frame currently set; and apply the M to the current video frame, thereby completing the registration of the current video frame after the M is applied with respect to the reference frame currently set.

8. The method of claim 1, further comprising determining whether a user is in a rapid eye movement (REM) sleep state, based on a machine learning based (ML-based) sleep state classifier that processes the eyeball motion signal corresponding to the illuminated face of the user; and output a first indicator that the user is in the REM sleep state, in response to a determination that the user is in the REM sleep state.

9. The method of claim 8, further comprising:

in response to a determination that the user is not in the REM sleep state, sending a second indicator that the user is in a non-REM sleep state to a second ML-based sleep state classifier; and classifying the non-REM sleep state as one non-REM class from among multiple non-REM classes, via the second ML-based sleep state classifier that processes the second indicator and at least one of:

vital sign information of the user sensed by a radar sensor; or piezo sensor signals indicating body movement of the user; and output a third indicator that indicates the one non-REM class.

10. The method of claim 1, wherein:

the face of a user is illuminated by non-visible light from a light source; and the video of the illuminated face is captured by a camera.

11. A system comprising:

a processor configured to:

receive a video of an illuminated face, video frames in the video associated with different time instants of a time series, respectively;

determine a region of interest (ROI) that includes an eye in a closed-eye state on the illuminated face based on at least one frame in a plurality of video frames in the video;

slice each ROI based on slice parameters for selecting a first vertical slice that includes a first eye centroid of the eye in the closed-eye state, and for selecting a first horizontal slice that intersects the first vertical slice at a pivot (P) located $l_p$ pixels from the first eye centroid; and determine an eyeball motion signal according to at least the time series, based on a measured value of a shadow intensity of the eye within at least one of the first vertical slice or the first horizontal slice at each of the different time instants.

12. The system of claim 11, wherein:

to determine the eyeball motion signal, the processor is further configured to determine an intensity variation over time in vertical slices that indicates eyeball motion in a horizontal direction according to the time series, based on a statistic of intensity values of the shadow measured spatially within the first vertical slice at each of the different time instants; and a reduction and an increase of the intensity values between the different time instants indicates the eyeball motion in first and second from among two opposite horizontal directions, respectively.

13. The system of claim 11, wherein:

to determine the eyeball motion signal, the processor is further configured to determine an intensity variation over time in horizontal slices that indicates eyeball motion in an up direction or a down direction according to the time series, based on a statistic of intensity values of the shadow measured spatially within the first horizontal slice at each of the different time instants; and a reduction and an increase of the intensity values between the different time instants indicates the eyeball motion in a first and a second from among two opposite vertical directions, respectively.

14. The system of claim 11, wherein the processor is further configured to:

slice the ROI based on grid parameters for selecting a plurality of vertical slices that includes the first vertical slice, and selecting a plurality of horizontal slices that includes the first horizontal slice;

determine an intensity variation over time in the plurality of vertical slices that indicates eyeball motion in a horizontal direction according to the time series, based on a first phase shift corresponding to a spacing $(s_v)$ between the plurality of vertical slices and an average of intensity values of the shadow measured spatially within each among the plurality of vertical slices at each of the different time instants; and determine an intensity variation over time in the plurality of horizontal slices that indicates eyeball motion in a vertical direction according to the time series, based on a second phase shift corresponding to a spacing $(s_h)$ between the plurality of horizontal slices and an average of intensity values of the shadow measured spatially within each among the plurality of horizontal slices at each of the different time instants.

15. The system of claim 11, wherein:

to receive the video, the processor is further configured to receive a current video frame of the illuminated face from the video; and the processor is further configured to:

detect a set (L) of facial landmarks on the illuminated face in the current video frame, the detected L including a first eye lash landmark and at least one of: a second eye lash landmark, eyebrow landmarks, or nose landmarks;

from among the detected L, identify a subset of registration points to be used to register non-reference frames from the video with respect to a reference frame;

in response to a determination that the current video frame is the reference frame, align the current video frame such that the illuminated face has a specified eye orientation, based on the detected L;

in response to a determination that the current video frame is not the reference frame:

register the current video frame with respect to the reference frame using the subset of registration points, wherein the illuminated face has the specified eye orientation in the current video frame after the registration; and remove jitter from the registered video frame.

16. The system of claim 15, wherein to remove the jitter, the processor is further configured to:

smoothen the detected L by applying a moving average filter that has a window length $(n_{ema})$ to remove noise in the detected L; and set the current video frame as a new reference frame, in response to a determination that a face-realignment threshold condition is satisfied based on a mean Euclidean distance (MED) from the subset of registration points of the current video frame to the subset of registration points of a previous video frame, respectively.

17. The system of claim 15, wherein to remove the jitter, the processor is further configured to:

in response to a determination that a face-realignment threshold condition is not satisfied and a determination that an expected-noise threshold condition is satisfied based on a mean Euclidean distance (MED) from the subset of registration points of the current video frame to the subset of registration points of a previous video frame, respectively, compute an affine transformation matrix (M) such that a multiplication product of the M by the subset of registration points of a previous video frame is equivalent to the subset of registration points of the reference frame currently set;

in response to a determination that the face-realignment threshold condition and the expected-noise threshold condition are not satisfied based on the MED, compute the M such that a multiplication product of the M by the subset of registration points of the current video frame is equivalent to the subset of registration points of the reference frame currently set; and apply the M to the current video frame, thereby completing jitter-free the registration of the current video frame after the M is applied with respect to the reference frame currently set.

18. The system of claim 11, wherein the processor is further configured to determine whether a user is in a rapid eye movement (REM) sleep state, based on a machine learning based (ML-based) sleep state classifier that processes the eyeball motion signal corresponding to the illuminated face of the user; and output a first indicator that the user is in the REM sleep state, in response to a determination that the user is in the REM sleep state.

19. The system of claim 18, wherein the processor is further configured to:

in response to a determination that the user is not in the REM sleep state, send a second indicator that the user is in a non-REM sleep state to a second ML-based sleep state classifier; and classify the non-REM sleep state as one non-REM class from among multiple non-REM classes, via the second ML-based sleep state classifier that processes the second indicator and at least one of:

vital sign information of the user sensed by a radar sensor; or piezo sensor signals indicating body movement of the user; and output a third indicator that indicates the one non-REM class.

20. The system of claim 11, further comprising:

a light source configured to illuminate the face of a user; and a camera configured to capture the video of the illuminated face.

* * * * *